(12) United States Patent
McGregor, II

(10) Patent No.: US 6,293,320 B1
(45) Date of Patent: Sep. 25, 2001

(54) MULTI-PURPOSE MACHINING APPARATUS

(76) Inventor: George M. McGregor, II, P.O. Box 820, DeRidder, LA (US) 70634

( * ) Notice: Subject to any disclaimer, the term of this patent is extended or adjusted under 35 U.S.C. 154(b) by 0 days.

(21) Appl. No.: 09/430,066

(22) Filed: Oct. 29, 1999

(51) Int. Cl.$^7$ ................................................. B27C 9/00
(52) U.S. Cl. .................... 144/1.1; 29/26 R; 29/27 B; 29/27 A; 82/14; 82/34 R; 142/1; 142/9; 142/26; 142/47; 144/3.1; 144/48.3; 144/48.7; 144/135.2; 144/154; 144/359; 144/365; 144/367; 408/712
(58) Field of Search .................. 82/14, 34 R; 29/26 R, 29/27 R, 27 B, 27 A; 142/1, 9, 26, 40, 47, 55; 144/1.1, 2.1, 3.1, 35.2, 48.3, 48.7, 135.2, 154, 359, 360, 365, 367; 408/712; 409/181, 182

(56) References Cited

U.S. PATENT DOCUMENTS

| | | | |
|---|---|---|---|
| 2,619,135 | * 11/1952 | Callaway | 144/1.1 |
| 2,747,626 | * 5/1956 | Goldschmidt | 144/1.1 |
| 2,765,009 | * 10/1956 | Doerner | 144/1.1 |
| 3,946,774 | * 3/1976 | McCorn, Jr. | 142/26 |
| 4,318,432 | * 3/1982 | Howey | 144/48.3 |
| 4,515,191 | * 5/1985 | Fetty | 144/35.1 |
| 4,787,127 | * 11/1988 | Beall | 144/487 |

* cited by examiner

Primary Examiner—W. Donald Bray
(74) Attorney, Agent, or Firm—John M. Harrison

(57) ABSTRACT

A precision multi-purpose machining apparatus for facilitating lathing, milling, drilling, sawing or routing operations typically using a rotary-type cutting tool. In a preferred embodiment the multi-purpose machining apparatus of this invention is characterized by an elongated support frame and a cutting tool mount cradle which is adjustably mounted on the support frame for receiving a cutting tool, such as an electric-powered DREMEL (trademark) rotary cutting tool. The support frame is capable of resting in a horizontal position, in which the cutting tool can be fitted with a cutting tool bit and the frame fitted with alternative workstock mounting attachments, to facilitate various lathing operations on a wooden or aluminum workstock. Alternatively, a saw table and saw blade can be removably mounted on the horizontal support frame and the cutting tool becomes a saw motor, the rotating shaft of which is connected to the saw blade by means of a drive belt, to facilitate various sawing operations. In another application, the frame can be disposed in a vertical configuration, in which a rotary table is removably mounted on the support frame and the cutting tool fitted with a milling blade or drill bit to facilitate milling and drilling operations, respectively. Alternatively, a router table can be removably mounted on the vertical support frame or on the rotary table, and a router bit mounted in the cutting tool to facilitate router operations.

28 Claims, 18 Drawing Sheets

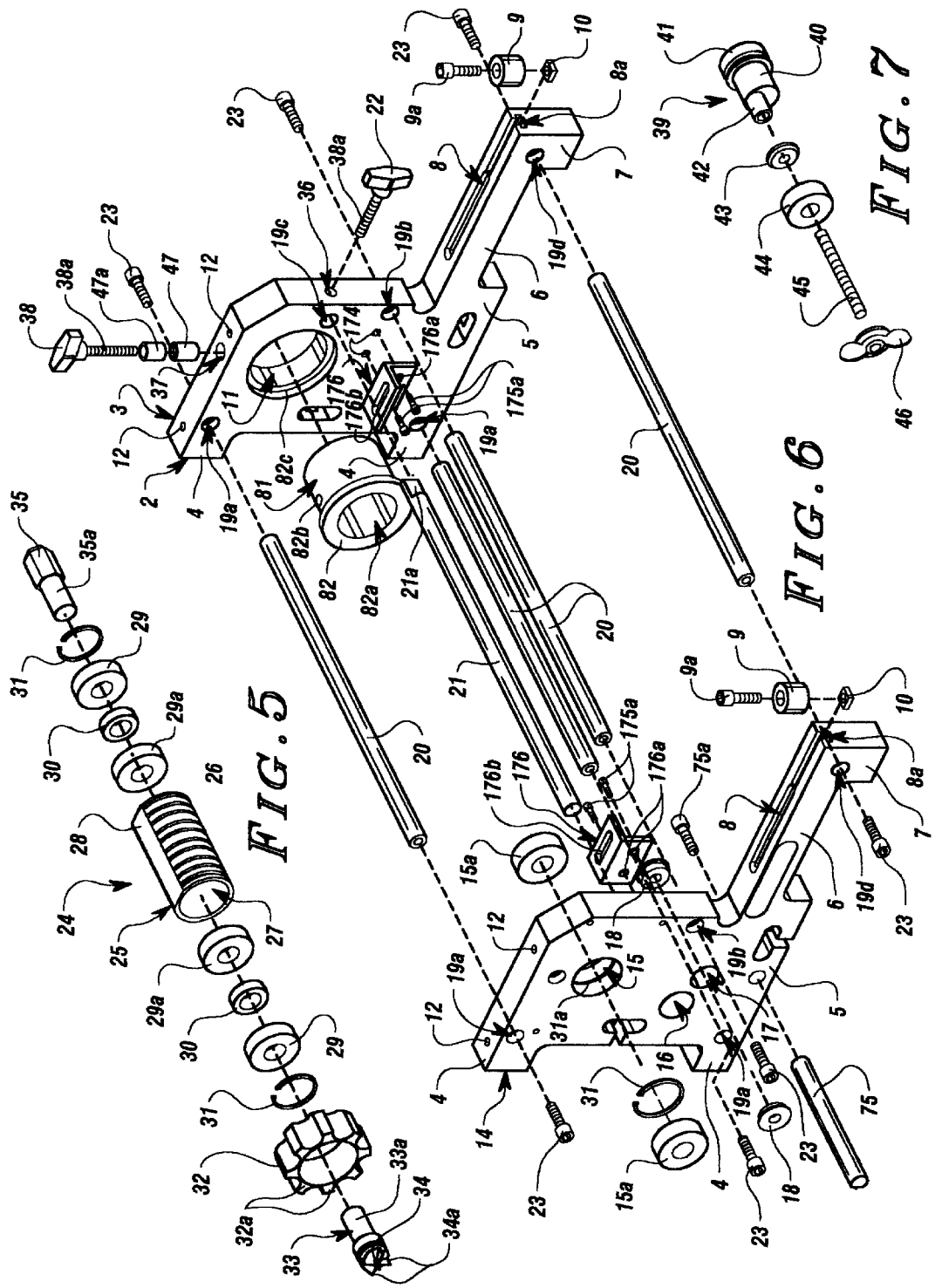

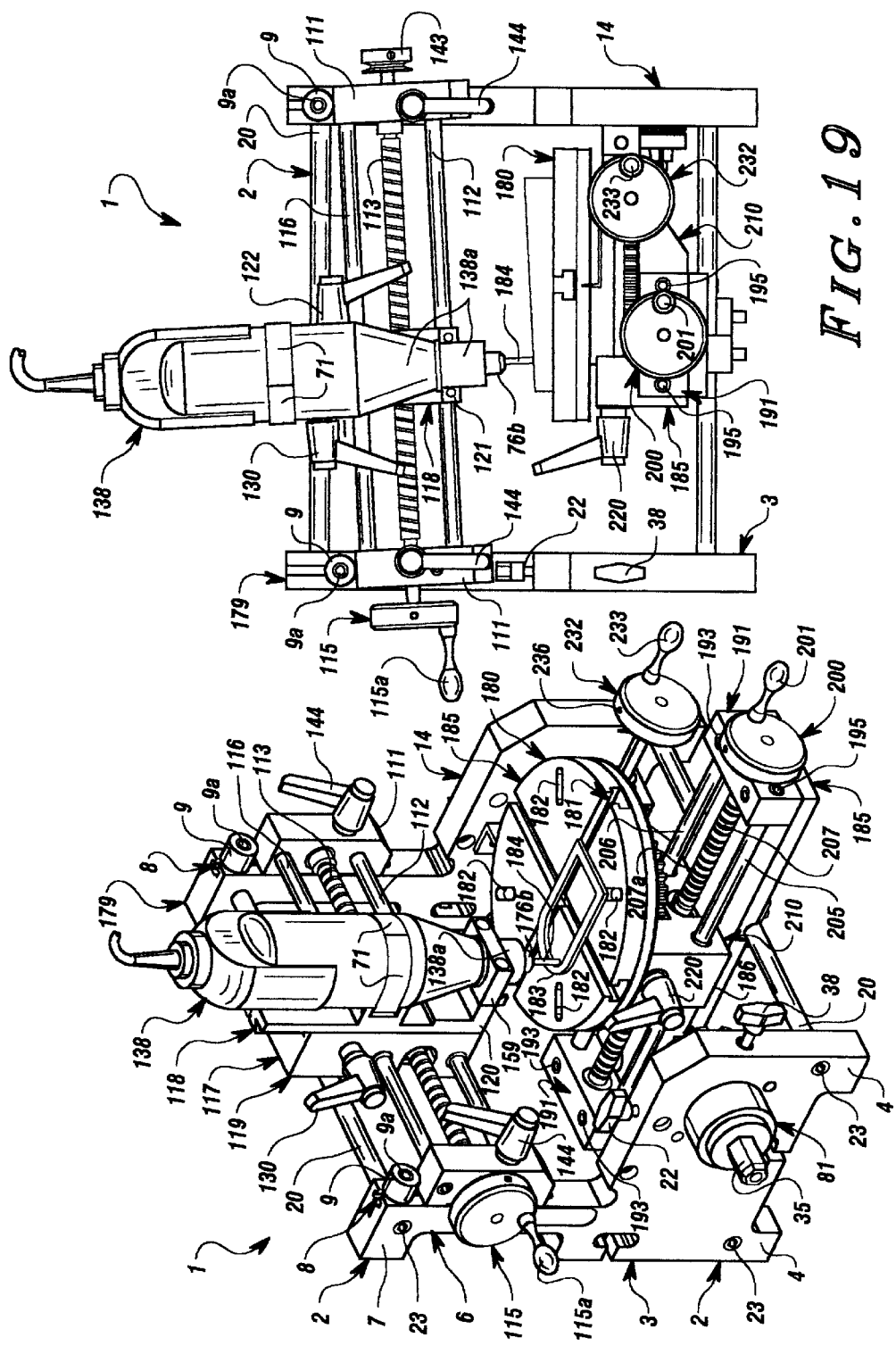

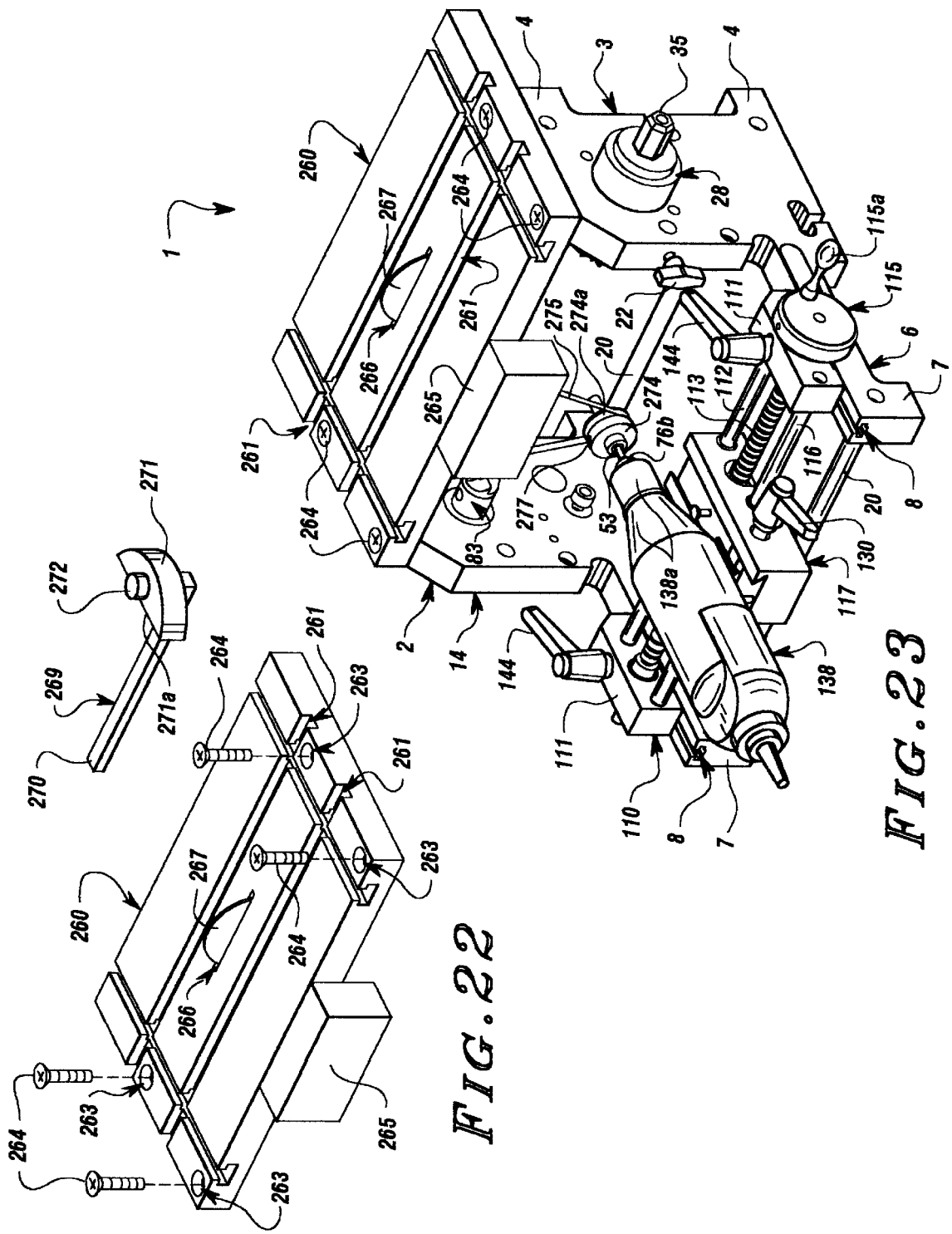

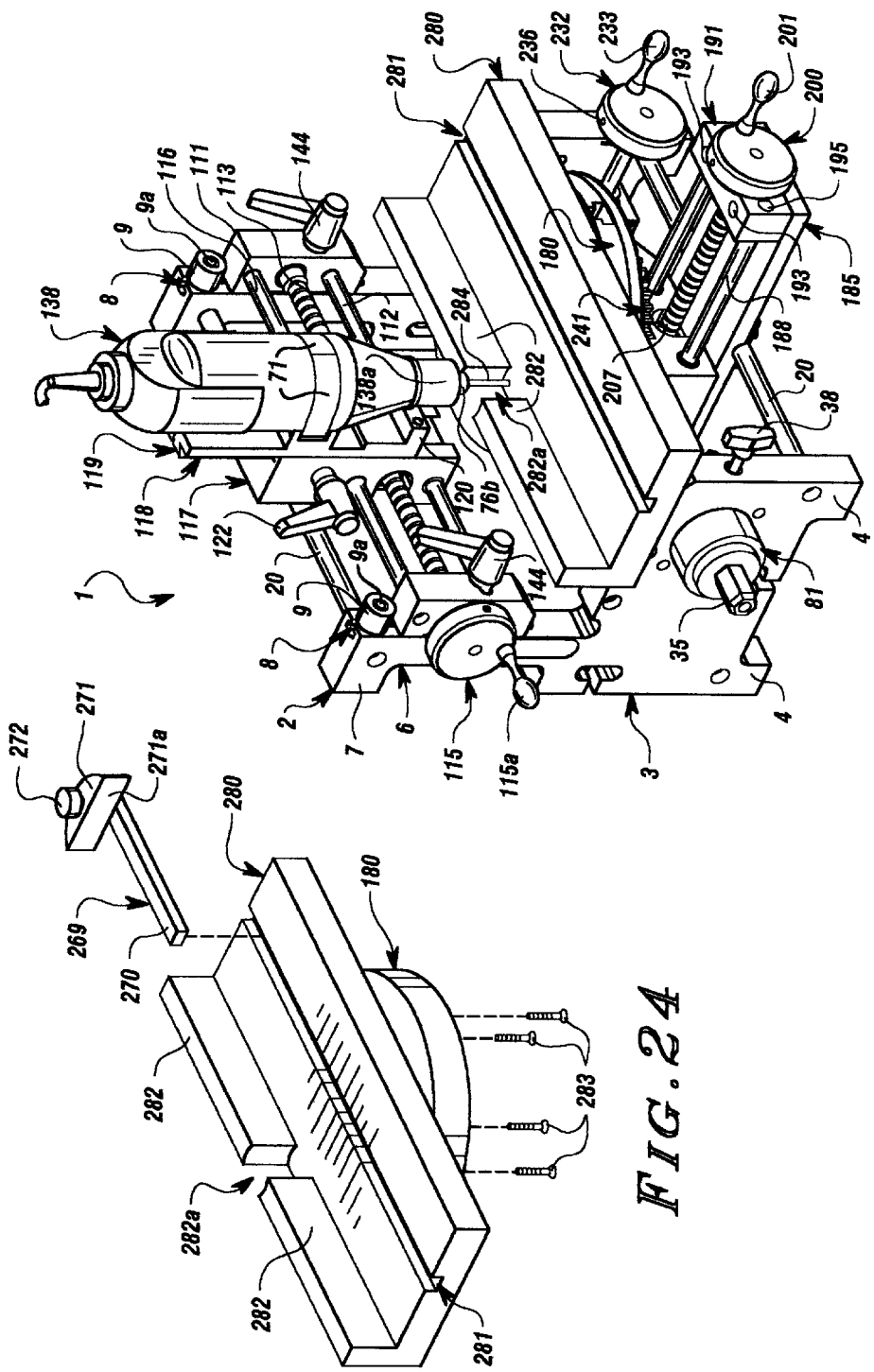

MULTI-PURPOSE MACHINING APPARATUS

BACKGROUND OF THE INVENTION

1. Field of the Invention

This invention relates to devices for facilitating cutting or machining operations and more particularly, to a precision multi-purpose machining apparatus which can be removably fitted with various attachments for facilitating lathing, milling, drilling, sawing, or routing operations on wooden or metal workstocks, typically using a rotary-type cutting tool. In a preferred embodiment the multi-purpose machining apparatus of this invention is characterized by an elongated support frame and a cutting tool mount cradle which is adjustably mounted along the support frame for receiving a powered cutting tool, such as an electric-powered DREMEL (trademark) rotary cutting tool. In one application of the invention, the support frame is capable of resting in a horizontal position, in which the cutting tool or flex shaft hand tool can be fitted with a cutting tool bit and the frame fitted with alternative workstock mounting attachments, to facilitate various lathing operations on a wooden or metal, typically aluminum, workstock. The cutting tool is capable of selective bilateral adjustment along the X-axis of the apparatus, and the cutting tool is advanced into or out of contact with the workstock along the Y-axis of the apparatus. Alternatively, a saw table and saw blade can be removably mounted on the horizontal support frame and the cutting tool becomes a saw motor, the rotating pinion shaft of which is connected to the saw blade by means of a drive belt, to facilitate rotating the saw blade in the table and accomplish various sawing operations on a workstock. In another application, the support frame can be disposed in a vertical configuration in which a rotary table is removably mounted on the support frame for receiving a workstock, and the cutting tool is fitted with a milling bit or drill bit to facilitate milling or drilling operations, respectively. The rotary table is capable of bidirectional adjustment along the Y-axis of the apparatus, whereas the cutting tool is advanced into or out of contact with the workstock along the Z-axis of the apparatus. Alternatively, a router table can be removably mounted on the vertical support frame or on the rotary table for receiving the workstock, and a router bit mounted in the cutting tool, to facilitate router operations on the workstock.

Various types of lathing, milling, drilling, sawing and routing apparatuses are known in the art for performing the respective machining operations on wooden and metal workstocks, under circumstances in which a particular shaping, sizing or dressing of the workstock is desired for woodworking or metalworking. However, machining apparatuses are typically designed for performing only one type of operation, thereby rendering it necessary for the woodworking or metalworking artisan to separately utilize multiple apparatuses for performing the respective desired machining operations. This disadvantage is particularly acute for amateur artisans, since lathes, milling machines, saws, drillpresses and router machines typically take up a large quantity of space, and many amateur woodworkers and metalworkers consequently encounter difficulty in providing the necessary space in which to maintain multiple machining apparatuses. The multi-purpose machining apparatus of this invention is characterized by various alternative attachments which can be removably mounted on a common frame for facilitating lathing, milling, drilling, sawing and routing operations, and is well-suited for machining small parts.

An object of this invention is to provide a multi-purpose machining apparatus which is compact and portable and includes various attachments for accomplishing a variety of machining operations, thus rendering it unnecessary to use separate machines for performing the respective machining operations.

Another object of this invention is to provide a multi-purpose machining apparatus characterized by an elongated support frame, a cutting tool mount cradle adjustably mounted along the support frame for receiving a cutting tool and various attachments which can be removably fitted on the support frame and cutting tool for facilitating lathing, milling, drilling, sawing or routing operations, respectively, on a workpiece, by operation of the cutting tool.

Still another object of this invention is to provide a multi-purpose machining apparatus characterized by an elongated support frame and a cutting tool mount cradle adjustably mounted along the support frame for receiving a cutting tool such as an electric-powered DREMEL (trademark) rotary cutting tool, which support frame in a first application of the invention, is capable of resting in a horizontal position in which the support frame and cutting tool can be fitted with alternative attachments to facilitate lathing or sawing operations, respectively, on a workstock, and which support frame in a second application of the invention is capable of resting in a vertical position in which the support frame and cutting tool can be fitted with alternative attachments to facilitate milling, drilling or routing operations, respectively, on a workstock.

Yet another object of this invention is to provide a multi-purpose machining apparatus characterized by an elongated support frame and a cutting tool mount cradle adjustably mounted along the X-axis of the support frame for receiving a typically rotary-type cutting tool, which support frame in a first application of the apparatus is capable of resting in a horizontal position in which the support frame can be fitted with a rotary cutting tool and the support frame fitted with alternative workstock mounting attachments, to facilitate various lathing operations on the workstock. Alternatively, a saw table and saw blade can be removably mounted on the horizontal support frame and the rotary cutting tool operates as a motor for the saw blade, wherein the rotating pinion shaft of the cutting tool is connected to the saw blade by means of a drive belt to facilitate various sawing operations on a workstock. In a second application of the apparatus, the support frame can be disposed in a vertical configuration, in which a rotary table is removably mounted on the support frame and the cutting tool is fitted with a milling bit or drill bit, to facilitate milling or drilling operations, respectively; alternatively, a routing table can be removably mounted on the vertical support frame or on the rotary table and a routing bit mounted in the cutting tool, to facilitate routing operations on a workstock.

SUMMARY OF THE INVENTION

These and other objects of the invention are provided in a multi-purpose machining apparatus which can be removably fitted with various attachments for facilitating lathing, milling, drilling, sawing and routing operations on wooden or metal, particularly aluminum, workstocks, typically using a rotary-type cutting tool. In a preferred embodiment the multi-purpose machining apparatus of this invention is characterized by an elongated support frame and a cutting tool mount cradle which is adjustably mounted on the support frame and removably receives a cutting tool, such as an electric-powered DREMEL (trademark) rotary cutting tool. In one application of the apparatus, the support frame is capable of resting in a horizontal position in which the cutting tool can be fitted with a cutting tool bit and the support frame fitted with alternative workstock mounting attachments, to facilitate various lathing operations on the workstock. The cutting tool is capable of selective bilateral adjustment along the X-axis of the apparatus, and the cutting tool is advanced into or out of contact with the workstock along the Y-axis of the apparatus. In an alternative application of the apparatus, a saw table and saw blade can be removably mounted on the horizontal support frame, and the cutting tool becomes a motor for driving the saw blade, wherein the piion shaft of the cutting tool is connected to the saw blade by means of a drive belt to facilitate rotating the saw blade in the table and accomplish various sawing operations on a workstock. In still another application of the apparatus, the support frame can be disposed in a vertical configuration, in which a rotary table is removably mounted on the support frame and the cutting tool is fitted with a milling bit or drilling bit to facilitate miling or drilling operations, respectively, on a workstock which rests on the rotary table. The rotary table is capable of bidirectional adjustment along the Y-axis of the apparatus, whereas the cutting tool is advanced into or out of contact with the workstock along the Z-axis of the apparatus. In yet another application of the multi-purpose machining apparatus, a routing table can be removably mounted on the vertical support frame or on the rotary table for receiving a workstock, and a routing bit is mounted in the cutting tool to facilitate routing operations on the workstock.

BRIEF DESCRIPTION OF THE DRAWINGS

The invention will be better understood by reference to the accompanying drawings, wherein:

FIG. 5 is an exploded, perspective view of a typical compression tensioner component of the multi-purpose machining apparatus, typically used in securing a workstock on the support frame in the various lathing operations of the apparatus;

FIG. 6 is an exploded, perspective view of a typical support frame component of the multi-purpose machining apparatus;

FIG. 7 is an exploded, perspective view of a typical belt tensioner cam component of the apparatus;

FIG. 18 is a perspective view of the multi-purpose machining apparatus, with the support frame resting in a vertical position and the milling frame illustrated in FIG. 17 removably mounted on the support frame, in a typical milling application of the apparatus;

FIG. 19 is front view of the multi-purpose machining apparatus illustrated in FIG. 18;

FIG. 22 is an exploded, perspective view of a saw table attachment of the multi-purpose machining apparatus;

FIG. 23 is a perspective view of the multi-purpose machining apparatus, with the support frame of the apparatus resting in a horizontal position and the saw table illustrated in FIG. 22 removably mounted on the support frame of the apparatus, in typical sawing application of the apparatus;

FIG. 24 is an exploded, perspective view of a router table attachment of the multi-purpose machining apparatus, more particularly illustrating a preferred bolting sequence for removably mounting the router table on the rotary table illustrated in FIG. 18;

FIG. 25 is a perspective view of the multi-purpose machining apparatus, with the support frame of the apparatus resting in a vertical position and the router table illustrated in FIG. 24 removably mounted on the rotary table of the apparatus in typical router application of the apparatus;

DESCRIPTION OF THE PREFERRED EMBODIMENTS

Figure 1:
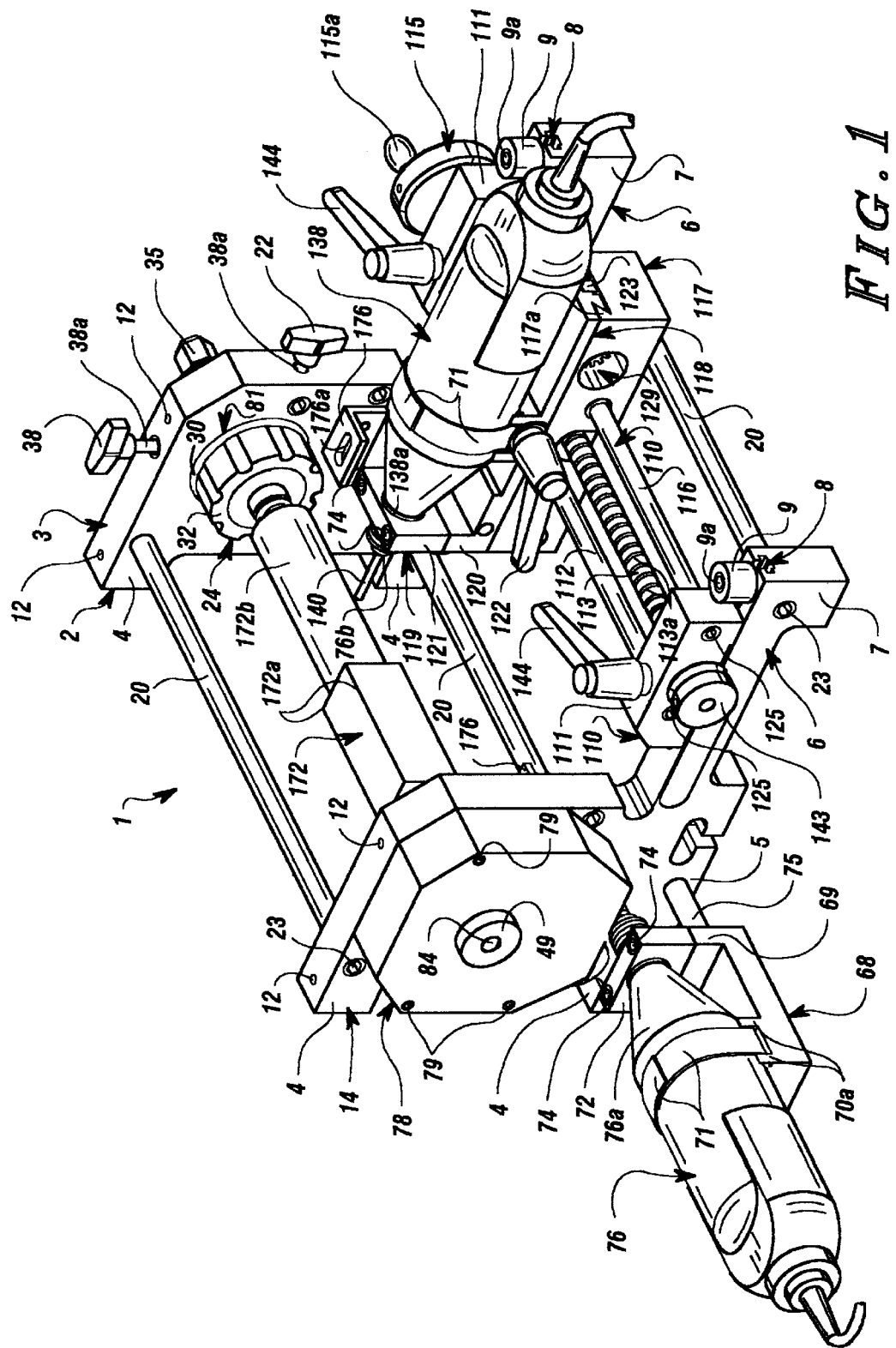
FIG. 1 is a perspective view of a preferred embodiment of the multi-purpose machining apparatus of this invention, with the support frame of the apparatus resting in a horizontal position, more particularly illustrating a typical lathing application of the apparatus, wherein X-axis movement of the rotary cutting tool along the frame is typically facilitated by means of a hand crank, and rotation of a workstock on the support frame is typically facilitated by operation of a rotary drive tool.

Referring initially to FIGS. 1 and 3–9 and particularly to FIG. 6 of the drawings, in a preferred embodiment the multi-purpose machining apparatus of this invention is generally illustrated by reference numeral 1 in FIG. 1. The multi-purpose machining apparatus 1 is characterized by an elongated support frame 2 which includes a live center end plate 3 and a drive end plate 14, connected by multiple fixed tie rods or shafts 20 and a removable steady rest rod or shaft 21, as particularly illustrated in FIG. 6 and hereinafter further described. The live center end plate 3 and drive end plate 14 are each typically constructed of metal such as aluminum, or reinforced plastic, in non-exclusive particular and each is characterized by a plate base 5 having a pair of spaced-apart vertical support legs 4 extending rearwardly therefrom, and an elongated frame arm 6 extending forwardly from the plate base 5, opposite the support legs 4, respectively. A horizontal support leg 7 protrudes downwardly from the extending end of each frame arm 6 and, with the plate base 5, supports the support frame 2 in a horizontal position on a support surface (not illustrated) in the lathing (FIG. 1) and sawing (FIG. 23) applications of the multi-purpose machining apparatus 1, as hereinafter described. The vertical support legs 4 of the live center end plate 3 and drive end plate 14, respectively, support the support frame 2 in a vertical position, typically in the milling (FIG. 18), drilling, or routing (FIG. 25) applications of the multi-purpose machining apparatus 1, as hereinafter further described.

As further illustrated in FIG. 6, a rear rod mount opening or aperture 19a is provided in the live center end plate 3 and drive end plate 14, respectively, substantially at the junction of each vertical support leg 4 with the plate base 5. Each rear rod mount opening 19a receives the corresponding end of an elongated fixed tie rod 20, and a tie rod bolt 23 is typically threaded into the corresponding end of each fixed tie rod 20 and seated on a bolt shoulder (not illustrated) provided in the rear rod mount opening 19a, to secure the fixed tie rods 20 in the live center end plate 3 and drive end plate 14 in an exemplary fashion. A bottom rod mount opening or aperture 19b is likewise provided in the live center end plate 3 and drive end plate 14, respectively, above the junction of the frame arm 6 with the plate base 5, and receives the corresponding end of an additional fixed tie rod 20, typically secured in the bottom rod mount openings 19b by means of respective rod mount bolts 23. A top rod mount opening (not illustrated) is typically provided in the live center end plate 3 and drive end plate 14, respectively, above the bottom rod mount opening 19b. An internally-threaded tie rod knob shaft opening or aperture 36 extends through the plate base 5 of the live center end plate 3, and communicates with the top rod mount opening 19c of the live center end plate 3, in substantially perpendicular relationship thereto. One end of an elongated removable steady rest rod 21 is inserted in the top rod mount opening 19c of the drive end plate 14, and the opposite, shaped end 21a of the steady rest rod 21 is inserted in the top rod mount opening 19c of the live center end plate 3. A tie rod knob 22, provided with a threaded shaft 38a, is threaded through the tie rod knob shaft opening 36, into contact with the shaped end 21a of the steady rest rod 21, to removably secure the steady rest rod 21 in the support frame 2, for purposes which will be hereinafter further described. A front rod mount opening 19d extends through the live center end plate 3 and drive end plate 14, respectively, at substantially the junction of the horizontal support leg 7 with the frame arm 6, and each front rod mount opening 19d receives the corresponding end of a fixed tie rod 20, typically secured in the corresponding front rod mount opening 19d by means of a rod mount bolt 23.

A compression tensioner opening 11 is provided in the plate base 5 of the live center end plate 3, and receives a cylindrical compression tensioner bushing 81, having a bushing bore 82a extending therethrough and provided with a bushing flange 82 which seats against a flange shoulder 82c, recessed in the compression tensioner opening 11. A compression tensioner 24 (illustrated in exploded view in FIG. 5), which engages and applies a selected tension to one end of a wooden workstock 172 (FIG. 1) in lathing application of the multi-purpose machining apparatus 1, as hereinafter described, is removably mounted in the bushing bore 82a of the compression tensioner bushing 81. A tensioner knob shaft opening or aperture 37 is provided in the plate base 5 of the live center end plate 3, and communicates with the compression tensioner opening 11, in substantially perpendicular relationship thereto. A cylindrical threaded insert 47a is typically seated in the tensioner knob shaft opening 37. The threaded shaft 38a of a tensioner mount knob 38 is threaded through the threaded insert 47a in the tensioner knob shaft opening 37, and extends through a locking spacer 47, seated in a bolt opening 82b which is provided in the compression tensioner bushing 81. The locking spacer 47 is removably seated against the compression tensioner 24 and secures the compression tensioner bushing 81 and compression tensioner 24 in the compression tensioner opening 11, by threading the threaded shaft 38a of the tensioner mount knob 38 in the locking spacer 47. A pair of bracket bolt openings 174 is provided in the plate base 5 of the live center end plate 3 and drive end plate 14, respectively, in spaced-apart relationship with respect to each other. Bracket bolts 175a are extended through respective bracket mount openings 176a, provided in a cutter guide support bracket 176, and threaded into the respective registering bracket bolt openings 174, to mount the template guide support brackets 176 to the respective live center end plate 3 and drive end plate 14. The purposes of the template guide support brackets 176 will be hereinafter further described. An elongated cutter frame adjustment slot 8 is shaped in the upper surface of the frame arm 6 of the live center end plate 3 and drive end plate 14, respectively, and a substantially coextensive adjustment channel 8a, having a generally t-shaped cross-sectional configuration, underlies the cutter frame adjustment slot 8. The adjustment channel 8 receives a square nut 10, and a stop bolt 9a is extended downwardly through a cylindrical taper stop 9 and the cutter frame adjustment slot 8, and threaded through the square nut 10 to secure the taper stops 9 on the frame arm 6, also for purposes hereinafter described.

Figure 3:
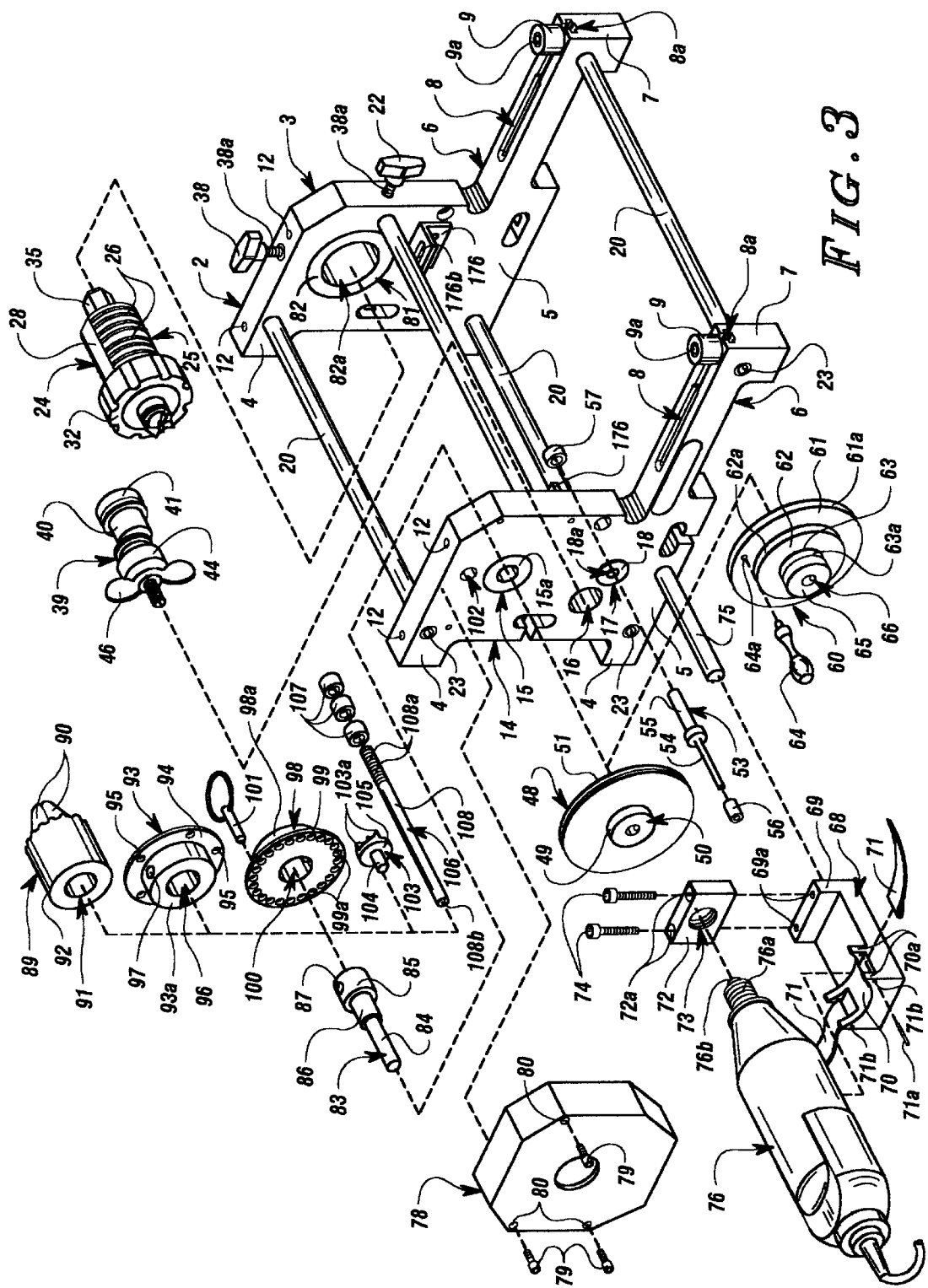
FIG. 3 is an exploded, perspective view of the multi-purpose machining apparatus illustrated in FIG. 1, excluding the cradle frame, cutting tool mount cradle and cutting tool elements, and more particularly illustrating various alternative workstock mounting attachments, typically for lathing operations of the apparatus.

Referring again to FIGS. 3 and 6 of the drawings, a headstock opening 15 extends through the plate base 5 of the live center end plate 14, and receives a pair of headstock bearings 15a, as well as a typically stainless steel retaining ring 31, seated between the adjacent headstock bearings 15a in a retaining ring groove 31a, which is provided circumferentially in the wall of the headstock opening 15. As illustrated in FIG. 3 and hereinafter further described, the headstock bearings 15a receive a headstock 83, which is used to mount a variety of alternative workstock mounting implements on the drive end plate 14 to facilitate securing a workstock 172 (FIG. 1) between the live center end plate 3 and drive end plate 14, in lathing application of the multi-purpose machining apparatus 1. A belt tensioner opening 16 extends through the drive end plate 14 in offset relationship with respect to a vertical axis extending through the headstock opening 15, and receives a belt tensioner cam 39, illustrated in exploded view in FIG. 7, for purposes which will be hereinafter further described. A pinion shaft opening 17 is provided in the plate base 5 of the drive end plate 14, substantially beneath the headstock opening 15, and a shaft bearing 18 is seated in the pinion shaft opening 17. A cradle mount rod or shaft 75, secured in the drive end plate 14 typically by means of a mount rod bolt 75a, extends outwardly from the plate base 5 of the drive end plate 14, adjacent to the bottom edge thereof. The cradle mount rod 75 is removably inserted in a rod opening (not illustrated) provided in a drive tool mount cradle 68, as illustrated in FIG. 3, for purposes which will be hereinafter described.

Figure 4:
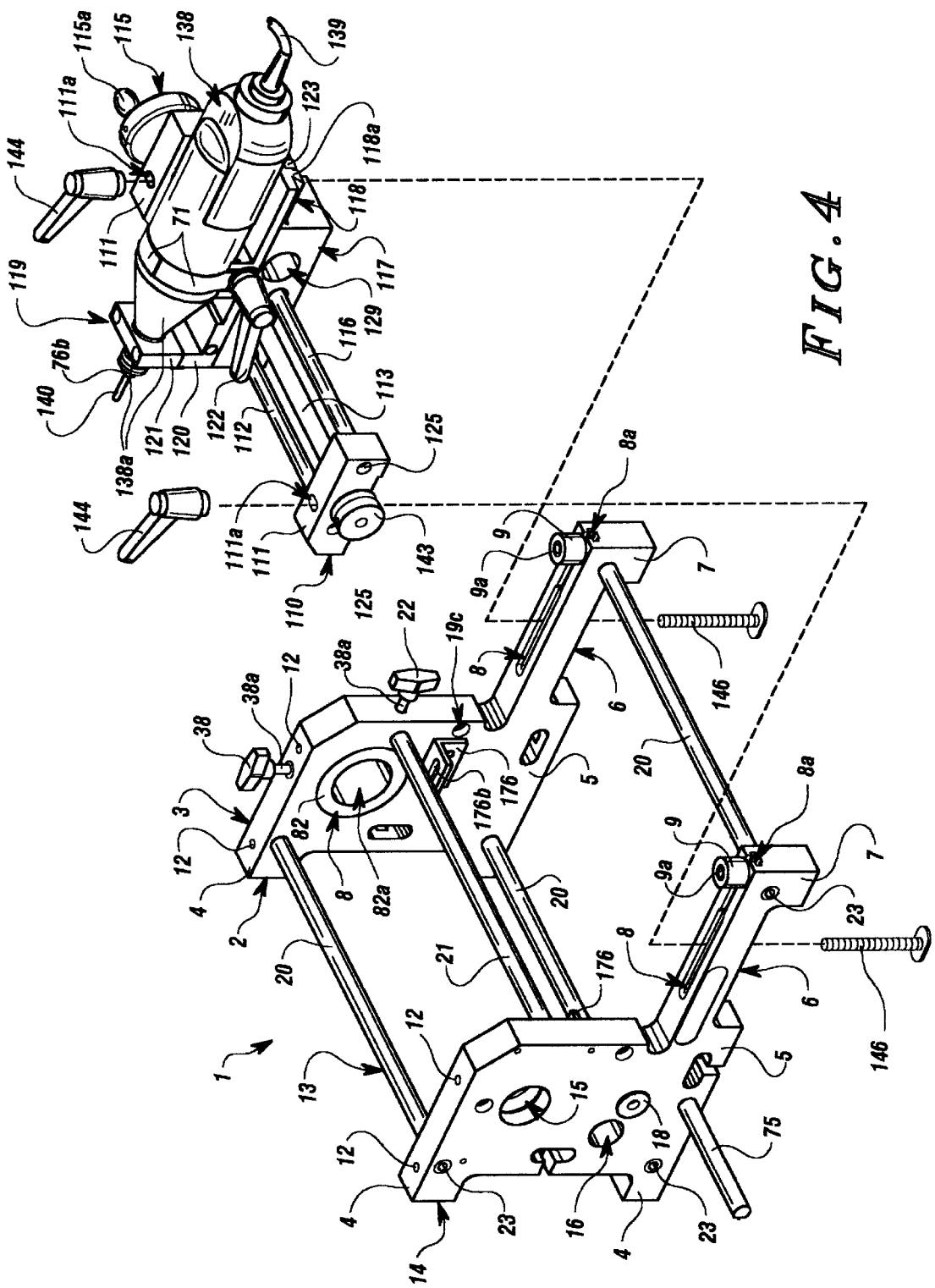
FIG. 4 is an exploded, perspective view of the multi-purpose machining apparatus, more particularly illustrating a preferred bolting sequence for removably mounting the cradle frame on the support frame of the apparatus illustrated in FIG. 1.
Figure 8:
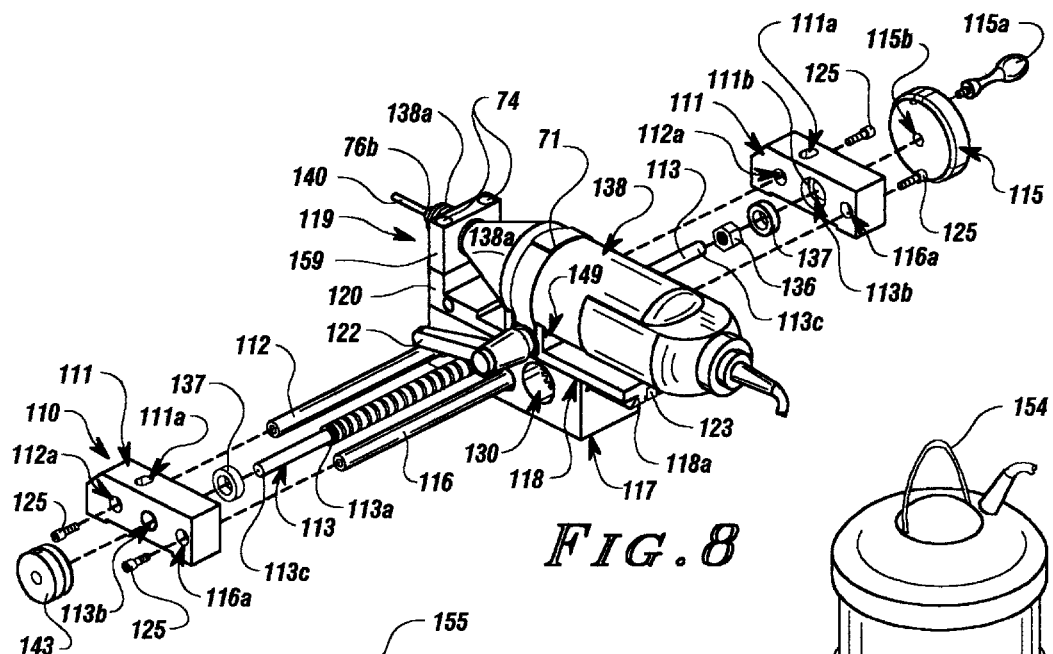
FIG. 8 is an exploded, perspective view of a typical cradle frame component of the apparatus, with a threaded-bore cutting tool mount block removably mounted on the cradle frame for receiving the threaded nose of a rotary cutting tool.
Figure 9:
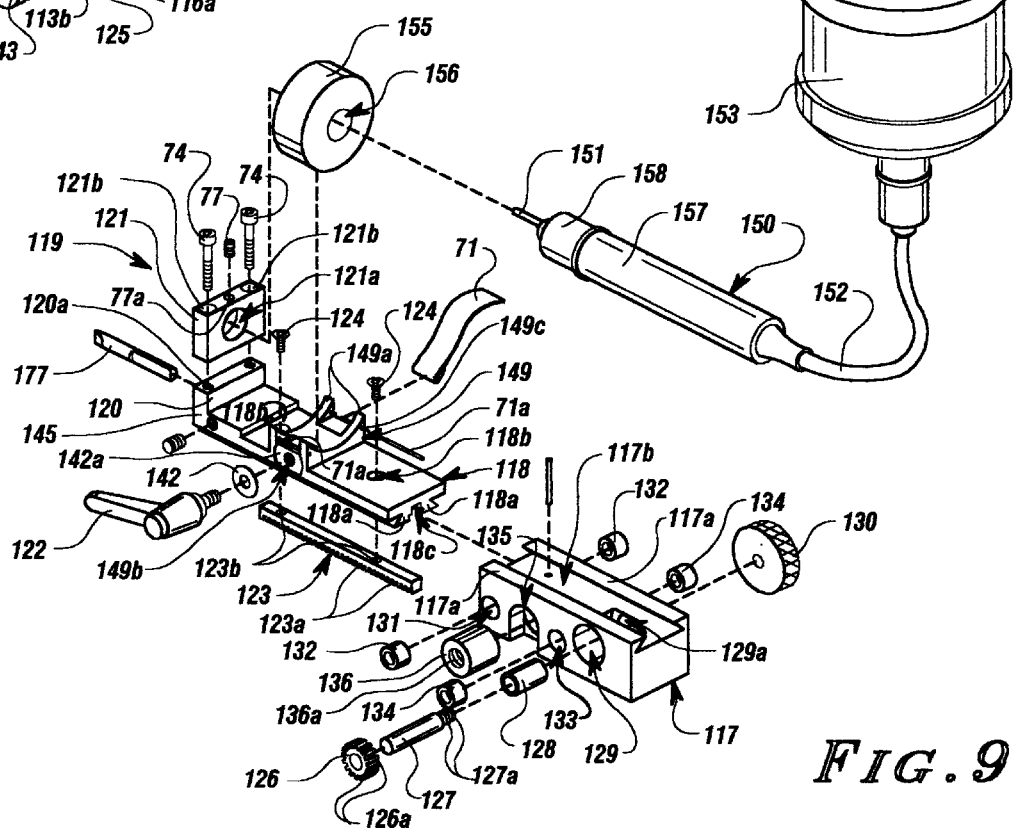
FIG. 9 is an exploded, perspective view of a typical cutting tool mount cradle component of the cradle frame illustrated in FIG. 8, with a smooth-bore hand tool mount block removably mounted on the cradle frame, more particularly illustrating mounting of a flex shaft hand tool on the cutting tool mount cradle.

Referring next to FIGS. 4, 8 and 9 of the drawings, in a preferred embodiment of the multi-purpose machining apparatus 1, an elongated cradle frame 110, the purpose of which will be hereinafter further described, is mounted on the frame arms 6 of the respective live center end plate 3 and drive end plate 14 of the support frame 2, the longitudinal axis of which cradle frame 110 defines the X-axis of the multi-purpose machining apparatus 1. As particularly illustrated in FIG. 8, the cradle frame 110 includes a pair of typically aluminum, generally rectangular taper blocks 111, each having a front rod opening 112a, a middle rod opening 113b and a rear rod opening 116a, extending transversely through the taper block 111. A handle opening 111a is provided in the top surface of each taper block 111, for purposes which will be hereinafter further described. As further illustrated in FIG. 8, the front rod openings 112a of the respective taper blocks 111 receive respective ends of a front cradle frame rod or shaft 112, and a rod mount bolt 125 is typically threaded in each end of the front cradle frame rod 112, through the corresponding front rod opening 112a, to secure the front cradle frame rod 112 in the respective front rod openings 112a. A rear cradle frame rod or shaft 116 is likewise mounted in the rear rod openings 116a of the respective taper blocks 111. The middle rod opening 113b is characterized by a recessed shoulder 111b, and a rod bearing 137 is seated on the shoulder 111b, inside the middle rod opening 113b. The non-threaded, tapered or stepped end portions 113c of an elongated X-axis lead screw 113, characterized by multiple screw threads 113a, extend through the rod bearings 137 and middle rod openings 113b of the respective taper blocks 111. A rod crank 115, fitted with an eccentric crank handle 115a, is provided with a crank opening 115b for fixedly receiving a tapered or stepped end portion 113c of the X-axis lead screw 113. Rotation of the rod crank 115 causes rotation of the X-axis lead screw 113 in the middle rod openings 113b of the respective taper blocks 111, and a drive pulley 143 is mounted on the opposite tapered end portion 113c of the X-axis lead screw 113, to facilitate travel of the cradle mount block 117 and the rotary cuttery tool 138, as hereinafter further described. As illustrated in FIG. 4, the cradle frame 110 is removably mounted on the support frame 2 by extending a pair of frame movement bolts 146 upwardly through the cutter frame adjustment slots 8 of the respective frame arms 6, and through the handle openings 111a of the respective taper blocks 111, and a frame adjustment handle 144 is threaded on each frame adjustment bolt 146. Accordingly, loosening of the frame adjustment handles 144 on the respective frame mount bolts 146 facilitates forward and reverse adjustment of the cradle frame 110 on the frame arms 6 of the respective support frame 2, to facilitate a parallel or offset configuration. In another lathing application of the multi-purpose machining apparatus 1 illustrated in FIG. 9, as hereinafter described, a flex shaft hand tool 150 is mounted on the cutting tool mount cradle 119 for cutting the workstock 172.

Referring now to FIG. 9, a cutting tool mount cradle 119 is mounted for adjustable, bidirectional movement on the cradle frame 110, along the X-axis of the multi-purpose machining apparatus 1. As further illustrated in FIG. 9, the cutting tool mount cradle 119 includes a cradle mount block 117, the top surface of which is characterized by a pair of tapered block dovetails 117a, which extend along the length of the cradle mount block 117 and define a block channel 117b therebetween. A front rod opening 131 extends transversely through the cradle mount block 117, and a pair of front rod opening bearings 132 is seated in adjacent relationship with respect to each other in the front rod opening 131. A rear rod opening 133 likewise extends through the cradle mount block 117, and a pair of rear rod opening bearings 134 is seated in adjacent relationship with respect to each other in the rear rod opening 133. A lead screw opening 135 extends transversely through the cradle mount block 117, between the front rod opening 131 and rear rod opening 133, and receives an interiorly-threaded lead screw nut 136. As illustrated in FIG. 8, the front cradle frame rod 112 of the cradle frame 110 extends through the front rod opening bearings 132 of the cradle mount block 117, and the rear cradle frame rod 116 of the cradle frame 110 extends through the rear rod opening bearings 134 of the cradle mount block 117, to sidably mount the cradle mount block 117 on the cradle frame 110, between the respective taper blocks 111. The X-axis lead screw 113 of the cradle frame 110 threadibly extends through the interiorly-threaded lead screw nut 136 of the cradle mount block 117. Accordingly, manual rotation of the rod crank 115 (FIG. 8) on the cradle frame 110 rotates the X-axis lead screw 113 in the lead screw nut 136, and the screw threads 113a of the X-axis lead screw 113 progressively engage the nut threads 136a (FIG. 9) provided in the lead screw nut 136, thereby causing the cradle mount block 117 to travel in either direction of the X-axis on the front cradle frame rod 112 and rear cradle frame rod 116, depending on the direction of rotation of the rod crank 115. A pinion opening 129 extends transversely through the cradle mount block 117, and receives a pinion bearing 128. An elongated pinion rod 127, provided with rod threads 127a on the end thereof, extends through the pinion bearing 128. A pinion 126, including multiple pinion teeth 126a, is fixedly mounted on the pinion rod 127, inside the pinion opening 129. A frame adjustment knob 130 threadibly engages the rod threads 127a of the pinion rod 127, to facilitate rotation of the pinion rod 127 and attached pinion 126 inside the pinion opening 129, by rotation of the frame adjustment knob 130, for purposes which will be hereinafter further described. The pinion teeth 126a of the pinion 126 protrude through a rectangular pinion slot 129a, provided in the top surface of the cradle mount block 117, also for purposes which will be hereinafter further described.

As further illustrated in FIG. 9, the cutting tool mount cradle 119 includes an elongated, substantially rectangular cradle plate 118 which is mounted for forward and reverse adjustment on the cradle mount block 117, along the Y-axis of the multi-purpose machining apparatus 1, responsive to rotation of the frame adjustment knob 130 on the cradle mount block 117. Two elongated, adjacent, parallel plate dovetails 118a, each having a tapered cross-section, extend downwardly from the bottom surface of the cradle plate 118 and engage the respective tapered, companion block dovetails 117a of the cradle mount block 117, as the plate dovetails 118a are sidably inserted in the block channel 117b (defined between the parallel block splines 117a of the cradle mount block 117). A rack slot 118c is defined between the parallel plate dovetails 118a, and an elongated rack 123, shaped with multiple rack teeth 123a, is typically seated in the rack slot 118c by means of a pair of rack mount screws 124, which are extended through respective screw openings 118b, provided in spaced-apart relationship in the cradle plate 118, and threaded through respective aligned rack bolt openings 123b, provided in the rack 123. As hereinafter described, rotation of the frame adjustment handle 130 causes the pinion teeth 126a of the rotating pinion 126, extending through the pinion slot 129a of the cradle mount block 117, to progressively engage the multiple rack teeth 123a of the rack 123 and facilitate forward and rearward adjustment of the cradle plate 118 on the cradle mount block 117, along the Y-axis of the multi-purpose machining apparatus 1. A cradle seat 149 is provided on the upper surface of the cradle plate 118, and includes opposing pairs of curved seat flanges 149a for receiving the cutting tool 138, as hereinafter described. Aligned stop pin openings 149c are provided in each pair of seat flanges 149a, each pair of which aligned pin openings 149c receives an elongated stop pin 71a. A mount strap 71 is looped around each strap pin 71a, and one of the mount straps 71 typically includes a loop element of a loop-pile fastener (not illustrated) for removably engaging the companion pile element of the loop-pile fastener, provided on the opposite mount strap 71, to secure the cutting tool 138 on the cradle seat 149. A threaded handle opening 149b is provided in one side of the cradle seat 149, and a threaded cradle lock handle 122 extends through a stop washer 142 and is threaded in the handle opening 149b, with the stop washer 142 seated in a washer seat 142a, encircling the handle opening 149b in the cradle seat 149. Accordingly, after the cradle plate 118 is adjusted to a selected position on the cradle mount block 117 by rotation of the frame adjustment knob 130, the cradle plate 118 can be locked at the selected position thereon by rotating and tightening the cradle lock handle 122 against the stop washer 142, thereby tightening the stop washer 142 against the cradle mount block 117 and preventing further movement of the cradle plate 118 on the cradle mount block 117. A plate flange 120 extends perpendicularly from the cradle plate 118, at the forward end thereof, for purposes which will be hereinafter further described. As further illustrated in FIG. 9, a cutter guide rod 177 can be removably inserted in a rod opening (not illustrated) provided in the cradle plate 118, and extends forwardly from the cradle plate 118, for purposes which will be hereinafter described.

Referring again to FIG. 9 of the drawings, a flex shaft hand tool 150 can be mounted on the cutting tool mount cradle 119 in one lathing application of the multi-purpose machining apparatus 1, as hereinafter described. The flex shaft hand tool 150 typically includes an elongated handle 157, connected to a flex shaft motor 153 by means of wiring 152, which flex shaft motor 153 rotates a carving bit 151, protruding from the hand tool nose 158 of the handle 157. A rectangular hand tool mount block 121 is mounted on the plate flange 120, typically by means of a pair of block mount bolts 74, extended through a pair of block bolt openings 121b, provided in spaced-apart relationship to each other in the hand tool mount block 121, and threaded into registering flange bolt openings 120a, provided in the plate flange 120. A central, smooth-bored block opening 121a is provided in the hand tool mount block 121, and a set screw 77 is threaded in a set screw opening 77a, which extends through the hand tool mount block 121 and communicates with the block opening 121a. A cylindrical hand tool adaptor 155, having a central mount opening 156 extending therethrough, is fitted on the cradle plate 118, between the cradle seat 149 and a block step 145, shaped in the cradle plate 118 adjacent to the plate flange 120. The flex shaft hand tool 150 is removably mounted on the cutting tool mount cradle 119, by initially extending the handle 157 of the flex shaft hand tool 150 through the central mount opening 156 of the hand tool adaptor 155 and registering block opening 121a of the mount block 121. The set screw 77 is then tightened against the handle 157, and the mount straps 71 are secured around the handle 157. The flex shaft hand tool 150 can then be operated in conventional fashion to facilitate cutting a workstock 172 (FIG. 1), mounted on the support frame 2, in lathing application of the multi-purpose machining apparatus 1 as hereinafter further described.

Referring again to FIG. 8 of the drawings, in another lathing application of the multi-purpose machining apparatus 1, an electric-powered, typically rotary-type cutting tool 138, such as that sold under the trademark DREMEL, is removably mounted on the cradle frame 119. As hereinafter described, the cutting tool 138 can be fitted with a cutting tool bit 140, a milling bit 184 (FIG. 18), a drill bit (not illustrated) or a routing bit 284 (FIG. 25), according to the knowledge of those skilled in the art, to facilitate lathing, milling, drilling or routing applications, respectively, of the multi-purpose machining apparatus 1. Alternatively, the cutting tool 138 can be fitted with a blade drive shaft 276 (FIG. 23) which operatively engages the saw blade 267 of a saw 259 when a saw table 260 is mounted on the support frame 2, and the cutting tool 138 is operated as a motor for rotating the saw 259 to facilitate sawing applications of the multi-purpose machining apparatus 1. A cutting tool mount block 159, having a central, interiorly-threaded block opening (not illustrated) extending therethrough, is mounted on the plate flange 120 of the cradle plate 118, typically by means of a pair of block mount bolts 74, as described above with respect to FIG. 9. The cutting tool 138 is typically removably mounted on the cutting tool mount cradle 119, by threading the threaded nose 138a of the cutting tool 138 through the central block opening (not illustrated) of the cutting tool mount block 119, placing the cutting tool 138 on the cradle seat 149 and securing the mount straps 71 around the cutting tool 138.

Figure 2:
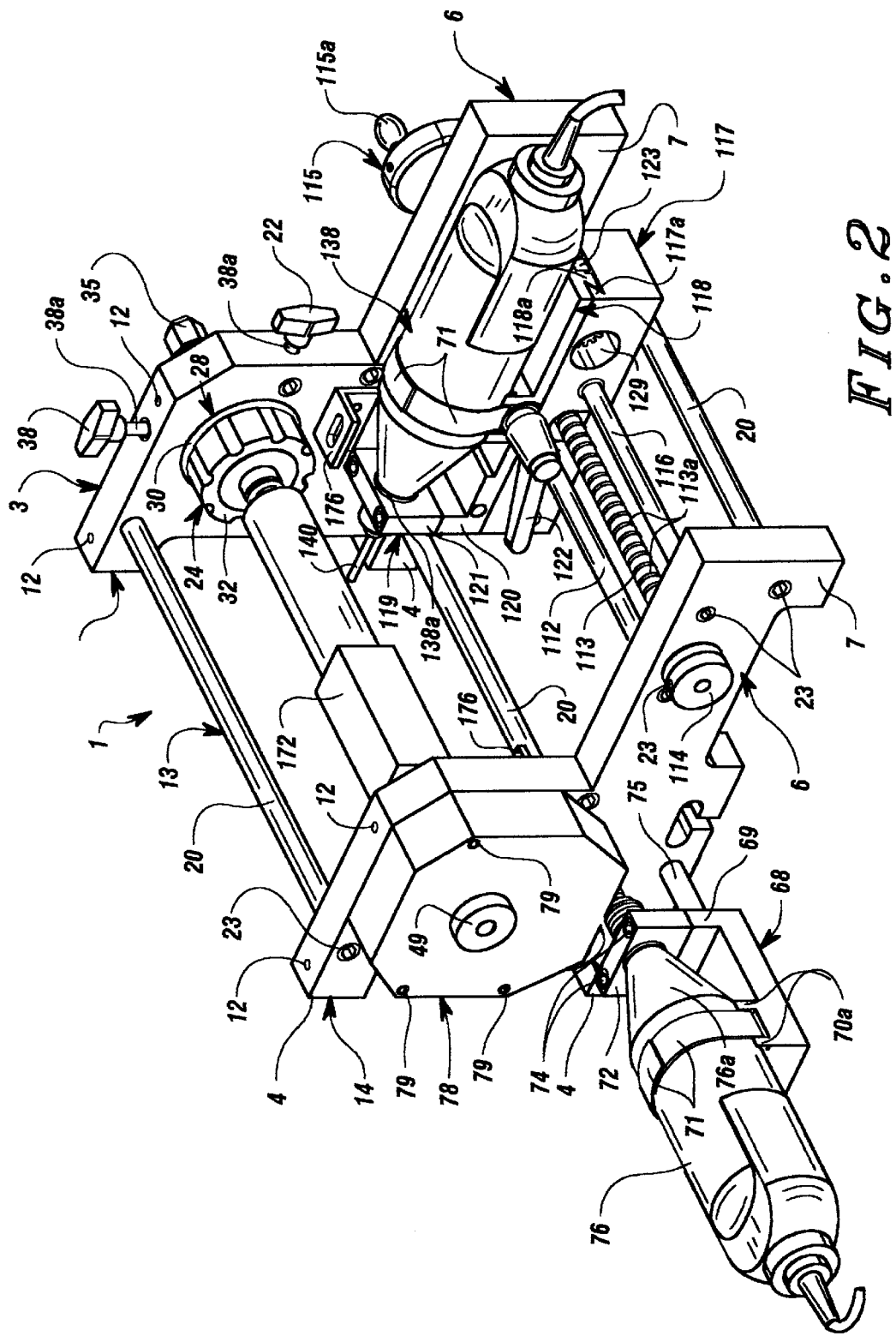
FIG. 2 is a perspective view of an alternative embodiment of the multi-purpose machining apparatus.

Referring next to FIG. 2 of the drawings, in a second embodiment of the multi-purpose machining apparatus 1, the taper blocks 111 (FIG. 8) are omitted and the front cradle frame rod 112, rear cradle frame rod 116 and X-axis lead screw 113 are mounted in the frame arms 6 of the live center end plate 3 and drive end plate 14, respectively. Accordingly, the ends of the front cradle frame rod 112 and rear cradle frame rod 116 are seated in respective facing frame rod openings (not illustrated) provided in the respective frame arms 6. A rod mount bolt 23 is typically extended through each frame rod opening (not illustrated), threaded into each end of the front cradle frame rod 112 and rear cradle frame rod 116 and tightened against a bolt shoulder (not illustrated), recessed in the frame rod opening. The tapered or stepped end portions 113c (FIG. 8) of the X-axis lead screw 113 extend through screw openings (not illustrated) provided in the respective frame arms 6. The drive pulley 114 is mounted on the drive end plate 14 end of the X-axis lead screw 113, whereas the rod crank 115 is mounted on the live center end plate 3 end of the X-axis lead screw 113. As in the embodiment described above with respect to FIGS. 4, 8 and 9, the cutting tool mount cradle 119 is mounted for bidirectional movement along the front cradle frame rod 112 and rear cradle frame rod 116, responsive to rotation of the X-axis lead screw 113 by rotation of the rod crank 115.

Referring next to FIGS. 1–3, 5–7, 10–16, 26 and 27, and particularly to FIG. 3 of the drawings, the multi-purpose machining apparatus 1 of this invention is capable of being used as a lathe, as illustrated in FIGS. 1, 2, 12–16, 26 and 27, and hereinafter described. Accordingly, as illustrated in FIG. 3, the support frame 2 is supported on a horizontal supporting surface (not illustrated), by means of the plate base 5 and horizontal support leg 7 of the live center end plate 3 and drive end plate 14, respectively. A selected one of various alternative workstock mounting attachments, including a chuck 89, faceplate 93, drive spur 103 and mandrel 106, is removably fitted on the drive end plate 14 of the support frame 2, and a compression tensioner 24 is removably mounted in the live center end plate 3 of the support frame 2. A wooden or aluminum workstock 172 (FIG. 1) is removably mounted between the compression tensioner 24 and the selected chuck 89, faceplate 93, drive spur 103 or mandrel 106, which selected element is rotated by means of a suitable drive mechanism according to the knowledge of those skilled in the art, to facilitate performing selected lathing operations on the rotating workstock 172 using the cutting tool 138 (FIG. 15), flex shaft hand tool 150 (FIG. 9) or a hand-held cutting tool 286 (FIG. 12), as hereinafter described. As illustrated in FIG. 3, the compression tensioner 24 is removably mounted in the bushing bore 82a of the compression tensioner bushing 81 (FIG. 6, mounted in the compression tensioner opening 11, provided in the live center end plate 3). For wood lathing applications, a live center spur 33, provided on one end of the compression tensioner 24, removably engages the live center end of the wooden workstock 172 (FIG. 12), with the selected workstock mounting attachment mentioned above, engaging the drive end of the workstock 172 as hereinafter described. Alternatively, for metal or wood lathing applications, the direction of the compression tensioner 24 can be reversed in the compression tensioner bushing 81, and a mandrel 106, illustrated in FIG. 3, inserted longitudinally through the center of an aluminum or wooden workstock 172 and threaded into a mandrel nut 35, provided on the opposite end of the compression tensioner 24, as hereinafter described.

As further illustrated in FIG. 5 in a preferred embodiment, the compression tensioner 24 includes an elongated, tubular compression tensioner barrel 25, having a tensioner bore 27 and provided with multiple, exterior compression threads 26, interrupted by a longitudinal flat surface 28, which extends longitudinally along the exterior surface of the compression tensioner barrel 25. A pair of outside bearings 29 and a pair of inside bearings 29a are seated in the tensioner bore 27, with a spacer 30 sandwiched between the outside bearings 29 and inside bearings 29a. A snap ring 31, seated in a snap ring groove (not illustrated) provided in the tensioner bore 27, engages the corresponding outside bearing 29, and secures the outside bearings 29, spacers 30 and inside bearings 29a in the tensioner bore 27. The spur shaft 33a of a live center spur 33, fitted with a spur tip 34 and spur blades 34a for engaging the live center end of a workstock 172 (FIG. 1), is mounted in an outside bearing 29, spacer 30 and inside bearing 29a, respectively, in the tensioner bore 27. The nut shaft 35a of the mandrel nut 35 is mounted in the other outside bearing 29, spacer 30 and inside bearing 29a, respectively, for purposes which will be hereinafter described. A tensioner nut 32, provided with multiple grip ridges 32a on the exterior surface thereof, is threaded on the compression threads 26 of the compression tensioner barrel 25. In the various lathing applications of the multi-purpose machining apparatus 1 as hereinafter further described, the compression tensioner barrel 25 of the assembled compression tensioner 24 is secured in the bushing bore 82a of the compression tensioner bushing 81, typically with the live center spur 33 of the compression tensioner 24 facing the drive end plate 14 of the support frame 2, as illustrated in FIG. 3. This is accomplished by threading the threaded shaft 38a of the tensioner mount knob 38 downwardly in the tensioner knob shaft opening 37 of the live center end plate 3 by clockwise rotation of the tensioner mount knob 38, until the threaded shaft 38a lightly engages the flat surface 28 of the compression tensioner barrel 25. The tensioner nut 32 of the compression tensioner 24 is rotated in the clockwise direction on the compression tensioner barrel 25, until the tensioner nut 32 engages the inside face of the live center end plate 3. As clockwise rotation of the tensioner nut 32 on the compression tensioner barrel 25 is continued, the compression tensioner barrel 25 is displaced in the bushing bore 82a of the compression tensioner bushing 81, toward the drive end plate 14, by operation of the interior tensioner nut threads (not illustrated) of the rotating tensioner nut 32 and companion exterior compression threads 26 of the compression tensioner barrel 25. During displacement of the compression tensioner barrel 25 in the bushing bore 82a, the threaded shaft 38a remains in contact with compression tensioner barrel 25 along the flat surface 28 thereof. Accordingly, as hereinafter further described, a wooden workstock 172 is rotatably mounted on the support frame 2, by initially attaching the drive end of the workstock 172 to the chuck 89, faceplate 93, or drive spur 103. The live center spur 33 of the compression tensioner 24 is then caused to firmly engage the live center end of the workstock 172, by rotating the tensioner nut 32 in the clockwise direction on the compression tensioner barrel 25, thereby advancing the spur tip 34 and spur blades 34a of the live center spur 33 against the workstock 172. Subsequent rotation of the chuck 89, faceplate 93, index head 98 or drive spur 103 by means of a suitable drive mechanism, as hereinafter described, causes rotation of both the workstock 172 on the support frame 2 and the idle live center spur 33 of the compression tensioner 24, thereby facilitating various lathing applications on the rotating workstock 172 by operation of the rotary cutting tool 138. Alternatively, for metal lathing applications the compression tensioner 24 is reversed in the compression tensioner bushing 81, with the mandrel nut 35 of the compression tensioner 24 facing the live center end plate 14 and threadibly engaging a mandrel 106, with the mandrel 106 extending through the longitudinal center of the metal workstock 172. Rotation of the mandrel 106 using a suitable drive mechanism, as hereinafter described, facilitates rotation of the workstock 172 on the support frame 2.

Figure 10:
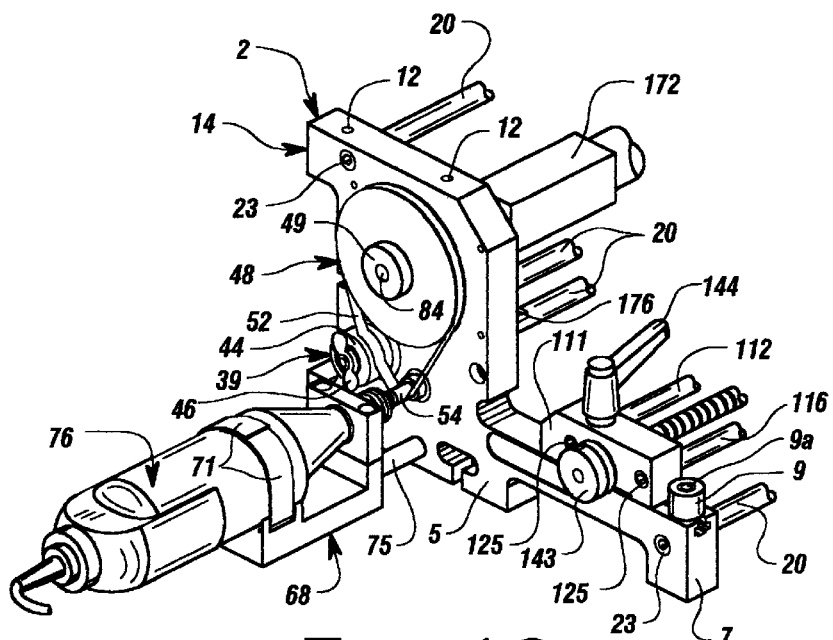
FIG. 10 is a perspective view, partially in section, of the multi-purpose machining apparatus illustrated in FIG. 1, with the belt guard removed from the support frame and more particularly illustrating a drive belt and drive pulley mechanism for powered rotation of a workstock on the support frame, in a typical lathing operation of the apparatus.
Figure 11:
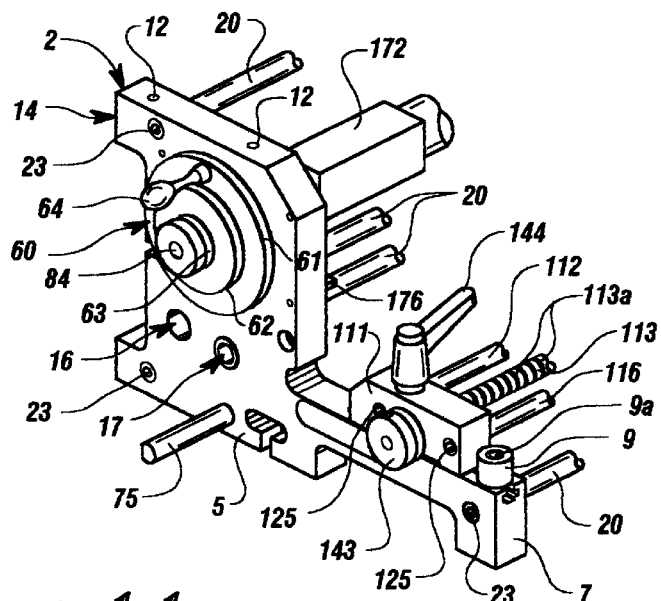
FIG. 11 is a perspective view, partially in section, of the multi-purpose machining apparatus, more particularly illustrating an alternative hand crank mechanism for manual rotation of a workstock on the support frame, in a lathing operation of the apparatus.

In mounting the chuck 89, faceplate 93, drive spur 103 or mandrel 106 on the support frame 2, the center portion 86 of a headstock 83, having a shaft 84 and a head 85, is seated in the headstock bearing 15a (provided in the headstock opening 15 of the second frame plate 14, FIG. 6). As hereinafter described, the shaft 84 of the headstock 83 is typically connected to a rotary drive tool 76, as illustrated in FIG. 10, or a manually-actuated step pulley 60, as illustrated in FIG. 11, to facilitate rotation of the headstock 83 in the headstock bushing 15a and the workstock 172 on the support frame 2. In one technique for mounting a typically small-diameter workstock 172 on the support frame 2, the chuck 89 can be mounted on the headstock 83, by initially inserting the head 85 of the headstock 83 in the chuck bore 91 of the chuck 89, and then extending an allen screw (not illustrated), through a screw opening (not illustrated) provided the chuck wall 92 of the chuck 89, and threading the allen screw into an alien screw opening 87, provided in the headstock head 85. The drive end of the workstock 172 can then be mounted in the chuck jaws 90 of the chuck 89, and the live center end of the workstock 172 engaged by the adjustable live center spur 33 of the compression tensioner 24, as hereinafter further described. The chuck 89 is then connected to a suitable drive system, such as the rotary drive tool 76 or manually-operated step pulley 60, as hereinafter further described, which is operated to rotate the workstock 172 on the support frame 2 and facilitate cutting the workstock 172 by means of the cutting tool 138 (mounted on the cutting tool mount cradle 119, FIG. 1), flex shaft hand tool 150 (FIG. 9) or hand-held cutting tool 286 (FIG. 12), as hereinafter described.

Figure 12:
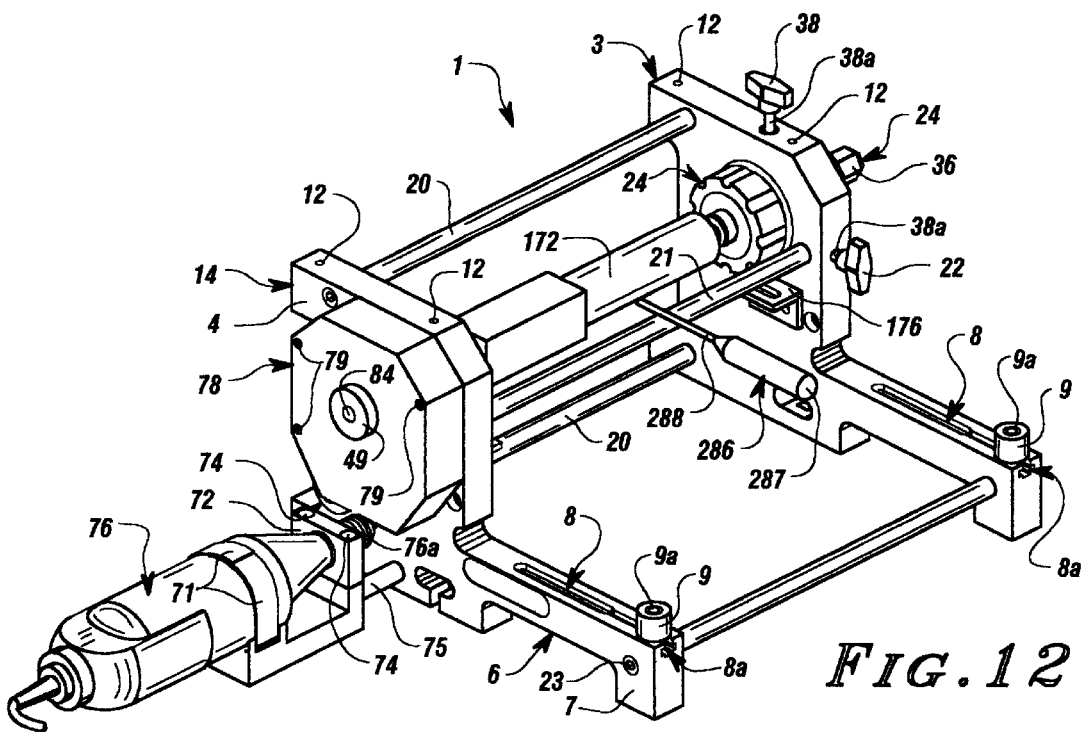
FIG. 12 is a perspective view of the multi-purpose machining apparatus, with the cradle frame and cutting tool removed from the support frame, more particularly illustrating a typical powered rotation of the workstock on the support frame and use of a hand-held cutting tool for lathing the workstock and resting on a "steady rest"

In an alternative technique for mounting the workstock 172 on the support frame 2, as further illustrated in FIG. 3, a face plate 93 can be bolted on the drive end of the workstock 172, by extending screws (not illustrated) through respective flange screw openings 95, provided in spaced-apart relationship around the circumference of the faceplate flange 94, and threading the screws into the workstock 172. The faceplate 93 is then mounted on the headstock 83 by inserting the head 85 of the headstock 83 in the faceplate bore 96 of the faceplate 93, and extending an allen screw (not illustrated) through a screw opening 97, provided in the hub 93a of the faceplate 93, and threading the allen screw into the allen screw opening 87 in the head 85 of the headstock 83. The live center spur 33 of the compression tensioner 24 is adjusted to engage the live center end of the workstock 172 by operation of the tensioner nut 32, as heretofore described. As described above with respect to the chuck 89, a suitable drive system such as those hereinafter further described, is attached to the headstock 83 for rotating the workstock 172 on the support frame 2 to facilitate cutting the workstock 172, typically by means of the cutting tool 138 (FIG. 1), the flex shaft hand tool 150 (FIG. 9) or a hand-held cutting tool 286 (FIG. 12).

Another alternative workstock mounting technique includes use of a drive spur 103, characterized by a drive spur shaft 104, terminated by a spur plate 105 having multiple spur blades 103a projecting therefrom, as further illustrated in FIG. 3. The drive spur 103 is mounted in the headstock 83 by inserting the drive spur shaft 104 in the head 85 of the headstock 83 and threading an allen screw (not illustrated) through the allen screw opening 87 (provided in the headstock head 85), into firm contact with the drive spur shaft 104 of the drive spur 103. The workstock 172 is mounted on the support frame 2 by holding the drive end of the workstock 172 against the spur blades 103a of the drive spur 103 while pressing the live center spur 33 of the adjustable compression tensioner 24 against the live center end of the workstock 172, by operation of the tensioner nut 32, as heretofore described. A rotary drive tool 76 (FIG. 10) or a manually-rotated step pulley 60 (FIG. 11) is then typically operated to rotate the headstock 83 and attached workstock 172, as the cutting tool 138, flex shaft hand tool 150, hand-held cutting tool 286 or other tool known to those skilled in the art is used to cut the workstock 172, as hereinafter described.

Figure 14:
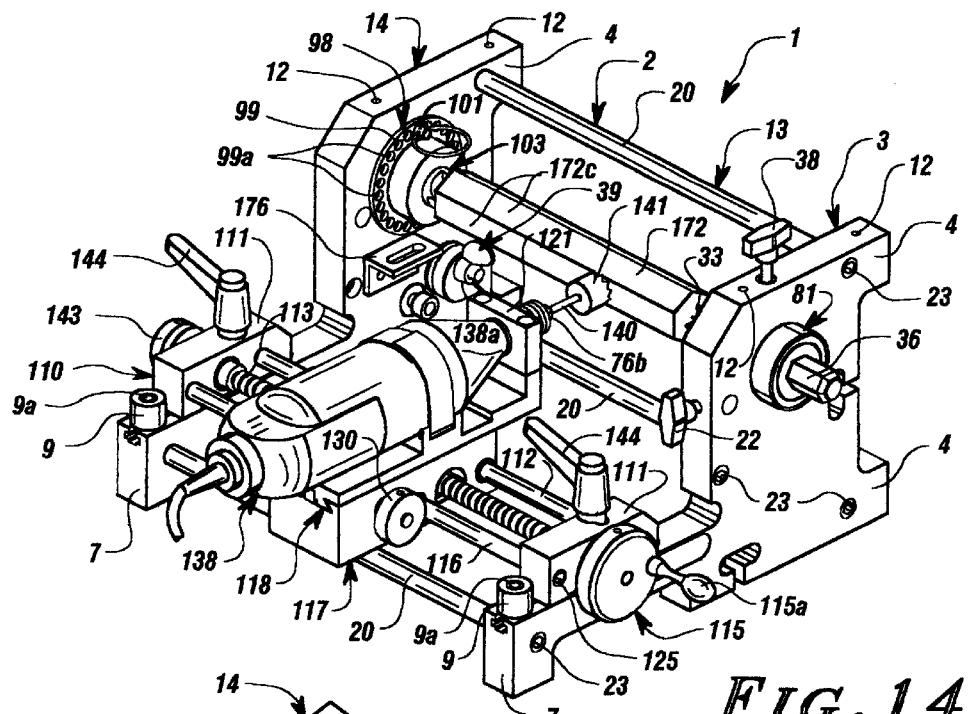
FIG. 14 is a perspective view of the multi-purpose machining apparatus, more particularly illustrating a typical index head mounted on the support frame and engaging a workstock, to prevent inadvertent rotation of the workstock on the support frame and facilitate shaping of multiple surfaces in the workstock using the rotary cutting tool, in an alternative lathing application of the apparatus.

According to still another technique for mounting a workstock 172 on the support frame 2, an index head 98, characterized by an index head flange 99 having multiple index openings 99a provided therein in spaced-apart relationship with respect to each other around the circumference of the indexing head flange 99, can be mounted on the head 85 of the headstock 83, to facilitate cutting multiple flat surfaces 172c in the workstock 172, as illustrated in FIG. 14. Accordingly, the drive spur 103 is initially secured in the headstock 83, typically by inserting the drive spur shaft 104 in the head 85 of the headstock 83 and tightening an allen screw (not illustrated), threaded in the allen screw opening 87 of the headstock 83, against the drive spur shaft 104. The index head 98 is then secured on the head 85 of the headstock 83, by inserting the head 85 of the headstock 83 in the index head bore 100 and threading a set screw (not illustrated) through a set screw opening (not illustrated), provided in the hub 98a of the index head 98, and typically seating the set screw in a screw seat (not illustrated), provided in the exterior surface of the head 85. The drive end of the workstock 172 is next held firmly against the spur blades 103a of the drive spur 103 while the compression tensioner 24 is adjusted against the live center end of the workstock 172, as heretofore described. An indexing pin 101 is extended through a selected index opening 99a and a registering index lock opening 102, provided in the drive end plate 14, as illustrated in FIG. 3, to prevent inadvertent rotation of the workstock 172 on the support frame 2 and facilitate cutting an initial flat surface 172c in the workstock 172 using the cutting tool 138, as illustrated in FIG. 14. The indexing pin 101 is removed from the index opening 99a and index lock opening 102, and the index head 98 and workstock 172 rotated and the indexing pin 101 re-inserted through another selected index opening 99a and the index lock opening 102, to facilitate cutting a second flat surface 172c in the workstock 172, adjacent to the first flat surface 172c, and so on.

As further illustrated in FIG. 3, according to yet another technique which can be used for mounting a metal or wooden workstock 172 on the support frame 2, a mandrel 106, characterized by an elongated mandrel shaft 108 having live center threads 108a adjacent to the live center end thereof, is used to mount the metal or wooden workstock 172 on the support frame 2, as illustrated in FIG. 3. The compression tensioner 24 is initially removed from the compression tensioner bushing 81, after rotating the tensioner mount knob 38 in the counterclockwise direction in order to disengage the threaded shaft 38a from the flat surface 28 of the compression tensioner barrel 25. The drive end 108b of the mandrel 106 is inserted in the head 85 of the headstock 83, and an allen screw (not illustrated) is then threaded through the allen screw opening 87 of the headstock head 85, and tightened against the mandrel shaft 108. The workstock 172 is inserted through the bushing bore 82a of the compression tensioner bushing 81, and the mandrel shaft 108 is inserted through a central workstock bore (not illustrated) which extends longitudinally through the workstock 172, to support the workstock 172 on the mandrel 106. The compression tensioner 24 is again secured in the compression tensioner bushing 81, with the mandrel nut 35 facing the mandrel 106, by rotating the tensioner mount knob 38a in the clockwise direction until the threaded shaft 38a lightly engages the flat surface 28 of the compression tensioner barrel 25. The live center threads 108a of the mandrel 106 are then caused to threadibly engage the mandrel nut 35 of the compression tensioner 24, by clockwise rotation of the mandrel nut 35. This action causes travel of the compression tensioner 24 on the mandrel 106, against the workstock 172, until a tight fit of the workstock 172 is achieved between the head 85 of the headstock 83 and the mandrel nut 35 of the compression tensioner 24. A selected number of mandrel spacers 107 can be fitted on the mandrel 106, between the workstock 172 and mandrel nut 33 or between the workstock 172 and the headstock 83, in order to accommodate space between a short workstock 172 and mandrel nut 33 or headstock 83, as needed. Moreover, a selected number of workstock segments (not illustrated) of a multi-segmented workstock 172 can be separated on the mandrel 106, as desired, by means of one or more of the mandrel spacers 107. Rotation of the headstock 83 in the headstock bushing 15a by means of a suitable drive system as hereinafter described, causes rotation of the workstock 172 with the mandrel 106, and various lathing operations can be applied to the rotating workstock 172 using the cutting tool 138, as hereinafter described.

Referring next to FIGS. 3, 7, 10 and 11 of the drawings, in a first drive system for rotating the workstock 172 on the support frame 2 as illustrated in FIG. 10, an electric-powered rotary drive tool 76 (FIGS. 3 and 10), substantially the same as the DREMEL (trademark) rotary cutting tool 138 described above with respect to FIG. 8, can be connected to the headstock 83 (FIG. 3, mounted in the headstock bushing 15a in the second frame plate 14), by means of a timing belt 52 and pulley 48. The headstock shaft 84 of the headstock 83 is extended through a central pulley opening 50, provided in the pulley hub 49 of the circular pulley 48, and a bolt (not illustrated) is typically threaded through a bolt opening (not illustrated) provided in the pulley hub 49 and tightly seated against the headstock shaft 84, to secure the pulley 48 on the headstock shaft 84. A drive tool mount cradle 68, provided with a cradle seat 70 and a pair of curved cradle flanges 70a on each side thereof for receiving the drive tool 76, is mounted on the drive end plate 14 of the support frame 2, by inserting the cradle mount rod or shaft 75 (extending from the drive end plate 14) in a cradle mount rod opening (not illustrated), provided in the drive tool mount cradle 68, and typically threading a set screw (not illustrated) through a screw opening (not illustrated) provided in one side of the drive tool mount cradle 68, and against the cradle mount rod 75. A strap pin 71a extends through a pair of registering strap pin openings 71b, provided in the respective cradle flanges 70a of each cradle flange 70a pair. A mount strap 71 is looped around each strap pin 71a, and one of the mount straps 71 is provided with a loop element (not illustrated) of a loop-pile fastener, for removably engaging the companion pile element (not illustrated) of the loop-pile fastener of the opposite mount strap 71, to facilitate removably mounting the drive tool 76 on the drive tool mount cradle 68, as hereinafter described. A rectangular mount block 72, having a central, interiorly-threaded mount opening 73 for receiving the threaded nose 76a of the drive tool 76, as hereinafter described, is mounted on a block flange 69, shaped in the end of the drive tool mount cradle 68 opposite the cradle surface 70, typically by means of a pair of block mount bolts 74. The block mount bolts 74 extend through respective block screw openings 72a, provided in spaced-apart relationship in the mount block 72, and are threaded into respective flange screw openings 69a, provided in spaced-apart relationship in the block flange 69. The shaft base 55 of a pinion shaft 53, fitted with a shaft rod 54 which extends from the shaft base 55, is removably inserted in the shaft opening 18a of a shaft bearing 18, provided in the pinion shaft opening 17 (FIG. 6) of the drive end plate 14. A set screw retainer 57 is typically fitted on the shaft base 55 of the pinion shaft 53, to secure the pinion shaft 53 in the shaft bearing 18. The shaft rod 54 of the pinion shaft 53 is mounted in the tool chuck 76b of the drive tool 76, as hereinafter described, with a spacer 56 typically interposed between the tool chuck 76b (FIG. 3) and the rod base 55 on the shaft rod 54. The drive tool 76 is mounted on the drive tool mount cradle 68 by threading the threaded nose 76a of the drive tool 76 in the threaded mount opening 73 of the mount block 72, securing the shaft rod 54 of the pinion shaft 53 in the tool chuck 76b of the drive tool 76 and securing the drive tool 76 on the cradle seat 70, between the cradle flanges 70a, by means of the mount straps 71. The timing belt 52 (FIG. 10) is seated in a belt groove 51, provided circumferentially in the pulley 48 as illustrated in FIG. 3, and extends around the shaft rod 54 of the pinion shaft 53, as further illustrated in FIG. 10. A belt tensioner cam 39 extends through the belt tensioner opening 16 of the drive end plate 14, as illustrated in FIG. 3, for imparting a selected tension to the timing belt 52 around the pulley 48 and shaft rod 54, as hereinafter described. As illustrated in FIG. 7, the belt tensioner cam 39 includes a cylindrical belt tensioner body 40, having a knurled adjusting knob 41 at one end thereof and an eccentric bolt collar 42 extending from the opposite end of the belt tensioner body 40. The bolt collar 42 receives a tapered bushing 43, and a belt wheel 44 is rotatably mounted on the bolt collar 42 and a stud 45 is threaded in the bolt collar 42. As illustrated in FIG. 3, the cylindrical belt tensioner body 40 of the belt tensioner 39 extends through the belt tensioner opening 16 (provided in the drive end plate 14), with the belt wheel 44 engaging the timing belt 52, as illustrated in FIG. 10. A wing nut 46 is threaded on the bolt 45, to secure the belt wheel 44 on the bolt collar 42 and the belt tensioner cam 39 in the belt tensioner opening 16. A selected degree of tension can be imparted to the timing belt 52 around the pulley 48 and pinion shaft 53, by loosening the wing nut 46, rotating the belt tensioner cam 39 using the knurled adjusting knob 41, thus causing the eccentric belt wheel 44 to deflect the drive belt 52 inwardly and apply additional tension on the pulley 48 and shaft rod 54, and then re-tightening the wing nut 46 against the belt wheel 44. A belt guard 78 (FIG. 3) is typically mounted on the drive end plate 14 of the support frame 2, to cover the pulley 48 and timing belt 52 during operation of the drive tool 76. This is typically accomplished by extending belt guard mount bolts 79 through respective guard bolt openings 80, provided in the belt guard 78, and threading the belt guard mount bolts 79 into respective threaded bolt openings (not illustrated), provided in the drive end plate 14 of the support frame 2. When the drive tool 76 is connected to the headstock 84 by means of the pinion shaft 53, timing belt 52 and pulley 48 as heretofore described with respect to FIG. 10, the drive tool 76 can be operated to rotate the headstock 84 and the attached drive chuck 89, faceplate 93, indexing head 98, drive spur 103 or mandrel 106 which, because each is alternatively attached to the workstock 172, causes rotation of the workstock 172 on the support frame 2.

Referring now to FIG. 11, according to a second drive system for rotating the workstock 172 on the support frame 2, a step pulley 60, instead of the power-driven pulley 48 heretofore described with respect to FIG. 10, can be mounted on the headstock shaft 84 of the headstock 83 to facilitate manual rotation of the workstock 172, as desired. As illustrated in FIG. 3, the step pulley 60 is typically characterized by an outer plate 61, having a circumferential outer belt groove 61*a*; a concentric middle plate 62, having a circumferential middle belt groove 61*a*; and a concentric inner plate 63, having an inner belt groove 63*a*. A concentric step pulley hub 65 is provided on the inner plate 63, and a central pulley opening 66 extends through the step pulley hub 65, the inner plate 63, the middle plate 62 and the outer plate 61, respectively. A handle 64 is threaded or otherwise typically removably secured in a handle opening 64*a*, provided in the outer plate 61 of the step pulley 60. As further illustrated in FIG. 3, the headstock shaft 84 of the headstock 83 is inserted through the pulley opening 66 of the step pulley 60. A set screw (not illustrated) is typically threaded through a pulley screw opening (not illustrated) provided in the step pulley hub 65, and tightened against the headstock shaft 84, to secure the step pulley 60 on the headstock 83. Accordingly, when the workstock 172 is mounted on the support frame 2 as heretofore described, manual rotation of the step pulley 60 in either direction using the handle 64, causes rotation of the headstock 83 and attached workstock 172, to facilitate lathing operations on the workstock 172 using the cutting tool 138, flex shaft hand tool 150, handheld cutting tool 286 or alternative tool, according to the knowledge of those skilled in the art, as hereinafter further described.

Figure 13:
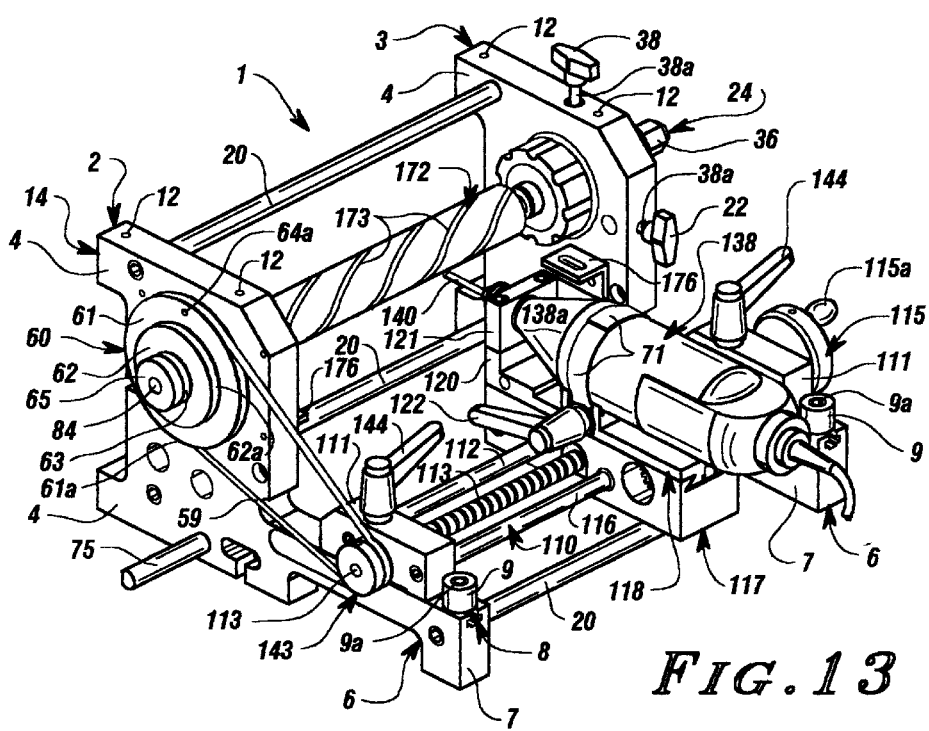
FIG. 13 is a perspective view of the multi-purpose machining apparatus, more particularly illustrating handcrank-driven, X-axis movement of the cutting tool along the support frame, coupled with rotation of a workstock on the support frame, in an alternative lathing application of the apparatus.

Referring next to FIG. 13 of the drawings, in still another drive system, rotation of the workstock 172 on the support frame 2 can be coupled with bidirectional migration of a tool such as the cutting tool 138 along the cradle frame 110, facilitated by manual rotation of the X-axis lead screw 113 of the cradle frame 110, typically by using the rod crank 115. Accordingly, this drive arrangement is typically used when it is desired to cut a continuous spiral groove 173 in the workstock 172, as illustrated in FIG. 13, or for cutting a diamond-shaped pattern (not illustrated) in non-exclusive particular, in the workstock 172, as hereinafter further described. After the handle 64 (FIG. 3) is unthreaded from the handle opening 64*a*, the step pulley 60 is mounted on the headstock shaft 84 of the headstock 83 as heretofore described with respect to FIG. 11. A typically round belt 59 is extended around the outer belt groove 61*a* of the step pulley 60, and around the drive pulley 143 (secured on the frame movement rod 113 of the cradle frame 110). The cradle frame 110 is typically adjusted rearwardly on the support frame 2 in order to tighten the round belt 59, by loosening the frame adjustment handles 144; moving the cradle frame 110 rearwardly on the frame arms 6 of the support frame 2; and tightening the frame adjustment handles 144. Alternatively, an elastic belt 59 of appropriate size can be trained around the drive pulley 143 and the outer plate 61, middle plate 62 or inner plate 63 of the step pulley 60. Accordingly, as the rod crank 115 is rotated on the cradle frame 110, the rotating X-axis lead screw 113 causes migration of the cradle mount block 117 and attached cutting tool 138 along the cradle frame 110, by operation of the screw threads 113*a* of the rotating X-axis lead screw 113 and companion bushing threads 136*a* of the lead screw bushing 136 (mounted in the frame movement rod opening 135 of the cradle mount block 117, FIG. 9). The direction of movement of the cradle mount block 117 on the cradle frame 110 depends on the direction of rotation of the rod crank 115. As the X-axis lead screw 113 rotates the drive pulley 143, the round belt 59, engaged by the drive pulley 143, causes rotation of the step pulley 60, headstock 83 and workstock 172. Application of the rotating cutting tool bit 140 of the migrating cutting tool 138 to the rotating workstock 172 typically forms a continuous spiral groove 173 in the surface of the workstock 172, as illustrated in FIG. 13.

Referring next to FIGS. 1–3, 8–16, 26 and 27, and initially to FIGS. 8 and 9 of the drawings, in a typical lathing application of the multi-purpose machining apparatus 1, the nose 138*a* (FIG. 4) of the cutting tool 138 is initially fitted with a cutting tool bit 140, in conventional fashion. The cutting tool 138 is then mounted on the cutting tool mount cradle 119, by threading the nose 138*a* of the cutting tool 138 in the block opening (not illustrated) of the cutting tool mount block 159, resting the cutting tool 138 on the cradle seat 149 of the cradle plate 118 and fastening the mount straps 71 around the cutting tool 138, as illustrated in FIG. 8. Alternatively, as illustrated in FIG. 9, the flex shaft hand tool 150 can be mounted on the cutting tool mount cradle 119 by mounting the hand tool mount block 121 on the plate flange 120 of the cradle plate 118, positioning the hand tool adaptor 155 on the cradle plate 118, mounting the handle 157 of the flex shaft hand tool 150 in the hand tool adaptor 155 and hand tool mount block 121 and securing the mount straps 71 around the handle 157, as heretofore described with respect to FIG. 9. In using either the cutting tool 138 or flex shaft hand tool 150, the steady rest rod 21 is initially removed from the support frame 2 by unthreading the tie rod knob 22 in the tie rod knob shaft opening 36 (FIG. 6), thereby removing the threaded shaft 38*a* of the tie rod knob 22 from contact with the tapered end 21*a* (FIG. 6) of the steady rest rod 21 and sliding the steady rest rod 21 through the rod mount opening 19*c* of the live center end plate 14. After the workstock 172 has been rotatably mounted on the support frame 2 and the drive tool 76, the manually-actuated step pulley 60 or the belt-driven step pulley 59 attached to the headstock 83 as heretofore described, a variety of lathing operations can be performed on the rotating workstock 172 by operation of the cutting tool 138 or flex shaft hand tool 150, as hereinafter described.

In still another lathing application of the multi-purpose machining apparatus 1 illustrated in FIG. 12, the cradle frame 110 is removed from the support frame 2, and the rotating workstock 172 is shaped using a hand-held cutting tool 286, characterized by a handle 287 having a cutting bit 288 extending therefrom, as hereinafter further described. Accordingly, the steady rest rod 21 is replaced on the support frame 2, by inserting the steady rest rod 21 through the rod mount opening 19c (FIG. 6) of the live center end plate 3, inserting the extending end of the steady rest rod 21 in the rod opening (not illustrated, provided in the inner face of the drive end plate 14) and tightening the threaded shaft 38a of the tie rod knob 22 against the tapered end 21a of the steady rest rod 21, in the rod mount opening 19c. The hand-held cutting tool 286 is typically rested on the steady rest rod 21 during the lathing operation, as further illustrated in FIG. 12.

Figure 15:
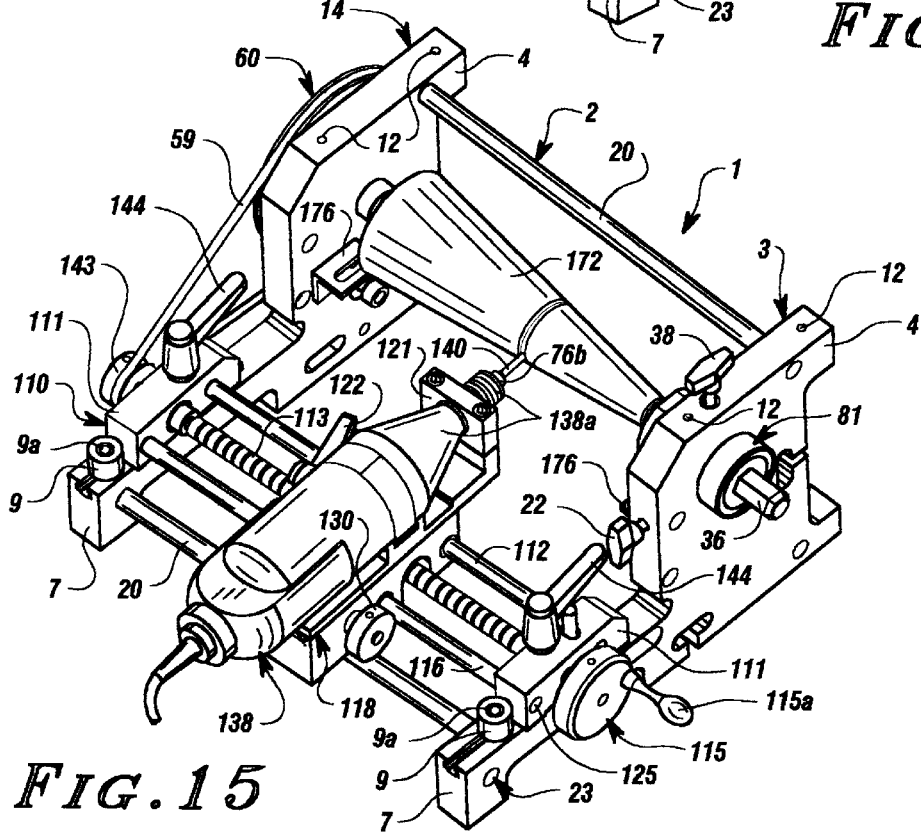
FIG. 15 is a perspective view of the multi-purpose machining apparatus, more particularly illustrating angled positioning capability of the cradle frame on the support frame to facilitate cutting a taper or cone in a workstock.

In FIG. 1, a wooden workstock 172 is illustrated mounted on the support frame 2, typically by means of the faceplate 93 or drive spur 103, as heretofore described with respect to FIG. 3, which workstock 172 initially had a square cross-sectional configuration along the entire length of the workstock 172. As the workstock 172 is rotated typically by operation of the drive tool 76 (FIG. 10), as illustrated in FIG. 1, or the step pulley 60 (FIG. 11), a rotating cutting tool bit 140 (FIG. 8) or a carving bit 151 (FIG. 9) is advanced forwardly along the Y-axis of the multi-purpose machining apparatus 1, into contact with the surface of the rotating workstock 172. This is accomplished by manual clockwise rotation of the frame adjustment knob 130 (FIG. 14), which causes the pinion teeth 126a (FIG. 9) of the rotating pinion 126 to progressively engage the rack teeth 123a of the rack 123, through the pinion slot 129a, thus advancing the cradle plate 118 and mounted cutting tool 138 or flex shaft hand tool 150, forwardly on the cradle mount block 117. The cradle plate 118 is typically locked at the forward, cutting position by operation of the cradle lock handle 122 (FIG. 15). The rotating cutting tool bit 140 or carving bit 151 initially cuts a circular groove (not illustrated) in the square workstock 172, and as the cutting tool 138 or flex shaft hand tool 150 is caused to gradually traverse the cradle frame 110 by manual rotation of the rod crank 115, the cutting tool bit 140 or carving bit 151 shaves the corners 172a off the workstock 172, forming a continuous circular segment 172b of the workstock 172 along the points of contact of the cutting tool bit 140 or carving bit 151 with the workstock 172. After completion of the lathing operation, the cutting tool bit 140 or carving bit 151 is removed from contact with the workstock 172 by unlocking the cradle plate 118 on the cradle mount block 117 using the cradle lock handle 122, followed by counterclockwise rotation of the frame adjustment knob 130. The workstock 172 is removed from the support frame 2 by rotating the tensioner nut 32 of the compression tensioner 24 in the counterclockwise direction, thereby displacing the compression tensioner barrel 25 in the bushing bore 82a of the bushing flange 82 and removing the live center spur 33 from contact with the live center end of the workstock 172.

Referring now to FIG. 14, in another lathing application of the multi-purpose machining apparatus 1, the index head 98 is mounted on the headstock 83, typically by initially mounting the drive spur shaft 104 of the drive spur 103 in the head 85 of the headstock 83 using an allen screw (not illustrated), and then mounting the hub 98a of the index head 98 on the head 85 of the headstock 83 using a set screw (not illustrated), as heretofore described with respect to FIG. 3. A wooden, typically cylindrical workstock 172 is mounted on the support frame 2, by holding the drive end of the workstock 172 against the spur blades 103a of the drive spur 103, while advancing the live center spur 33 of the compression tensioner 24 against the live center end of the workstock 172 by operation of the tensioner nut 32, as heretofore described. The workstock 172 is then locked on the support frame 2 to prevent inadvertent rotation thereof, by extending the indexing pin 101 through a selected pin opening 99a of the index head flange 99 and registering index lock opening 102 (provided in the drive end plate 14 of the support frame 2, FIG. 3). A cutting tool bit 140, typically fitted with a scoring spur 141, is removably mounted in the tool chuck 76b of the cutting tool 138. During operation of the cutting tool 138, the scoring spur 141 of the cutting tool bit 140 is advanced forwardly into contact with the workstock 172 by clockwise rotation of the frame adjustment knob 130, and locked in place using the cradle lock handle 122. As the cutting tool 138 is repeatedly caused to bidirectionally traverse the cradle frame 110 along the workstock 172 by clockwise and counterclockwise rotation of the rod crank 115, the rotating scoring spur 141 cuts a smooth, flat surface 172c in the workstock 172. The scoring spur 141 is removed from contact with the workstock 172 by unlocking the cradle lock handle 122 and rearward movement of the cradle plate 118, facilitated by counterclockwise rotation of the frame adjustment knob 130. The indexing pin 101 is removed from the index lock opening 102 (FIG. 3) and index opening 99a, the index head 98 and workstock 172 partially rotated on the support frame 2 and the indexing pin 101 then extended through another selected index opening 99a and the index lock opening 102, to lock the workstock 172 at a second position. As the rotating scoring spur 141 is again advanced into contact with the workstock 172 and the cutting tool 138 caused to traverse the cradle frame 110 along the workstock 172, a second smooth, flat surface 172c is cut in the workstock 172, adjacent to the first flat surface 172c. This procedure is repeated until multiple, adjacent flat surfaces 172c are shaped in the workstock 172, and the workstock 172 has a cross-sectional configuration in the shape of an octagon, hexagon, pentagon or the like, as desired. The cross-sectional configuration of the finished workstock 172 depends on the diameter of the scoring spur 141 and the degree of incremental rotation of the workstock 172 between lathing operations.

Figure 16:
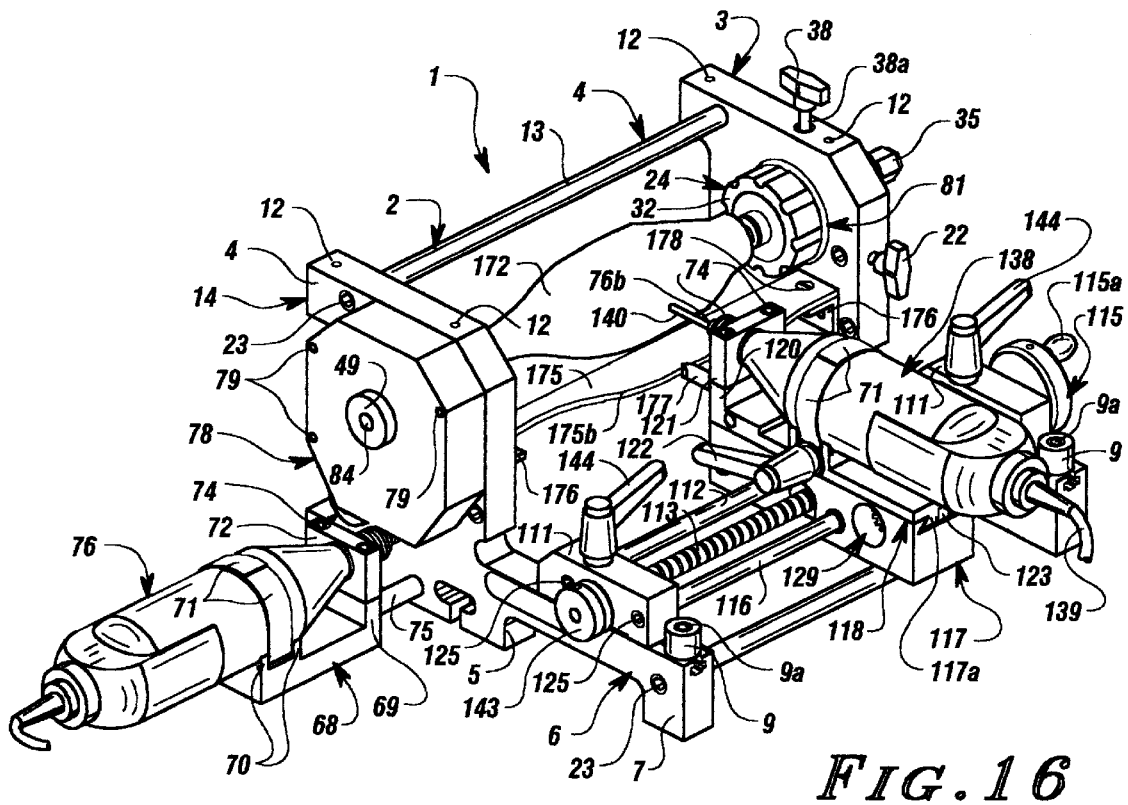
FIG. 16 is a perspective view of the multi-purpose machining apparatus, more particularly illustrating a profiled cutter guide plate of selected configuration removably mounted on the support frame for variously limiting the cutting depth of the cutting tool along the workstock as the cutting tool is handcrank-driven along the X-axis, to facilitate profile cutting of the workstock in an alternative lathing application of the apparatus.

As illustrated in FIG. 16, in still another lathing application of the multi-purpose machining apparatus 1, an elongated template guide plate 175 is fitted on the support frame 2, to facilitate cutting a selected profile in the surface of the workstock 172. The template guide plate 175 is mounted on the template guide support brackets 176 (mounted on the inside faces of the live center end plate 3 and drive end plate 14, respectively), with the contoured template edge 175b of the template guide plate 175 facing the cradle frame 110, as illustrated. This is accomplished by extending a mount screw 178 through a screw opening (not illustrated) provided in each end of the template guide plate 175, and threading the mount screw 178 through a bracket slot 176b (FIG. 3), provided in each template guide support bracket 176. A template guide rod 177 is removably inserted in a rod opening (not illustrated), provided in the front end of the cradle mount block 118. The typically cylindrical workstock 172 is rotatably mounted on the support frame 2, typically by means of the faceplate 93, drive spur 103 or mandrel 106, as heretofore described. The drive tool 76 (FIG. 10) or step pulley 60 (FIG. 11) is then operated to rotate the workstock 172 on the support frame 2, and the rotating cutting tool bit 140 or carving bit 151 (FIG. 9) is advanced forwardly on the cradle plate 118 and into contact with the workstock 172, by operation of the frame adjustment knob 130 (FIG. 13), and locked into position using the cradle lock handle 122. Accordingly, the cutting tool bit 140 or carving bit 151 cuts into the workstock 172 until the template guide rod 177 contacts the template edge 175b of the template guide plate 175, which thereby limits the cutting depth of the cutting tool bit 140 or carving bit 151 into the workstock 172. This procedure is repeated throughout the entire length of the workstock 172, as lateral migration of the cutting tool 138 along the cradle frame 110 is effected using the rod crank 115. Due to the curved configuration of the template edge 175b, the cutting tool bit 140 or carving bit 151 cuts into the workstock 172 at various depths along the template guide plate 175, and is used to shape the workstock 172 until the profile of the workstock 172 substantially matches the profile of the template edge 175b of the template guide plate 175, as illustrated.

As illustrated in FIG. 13, in yet another lathing application of the multi-purpose machining apparatus 1, manual rotation of the rod crank 115 causes migration of the cutting tool 138 on the cradle frame 110, coupled with rotation of the workstock 172 on the support frame 2, to facilitate cutting a continuous spiral groove 173 in the workstock 172, as desired. Accordingly, the belt guard 78, pulley 48 (FIG. 10), timing belt 52 and drive tool mount cradle 68 are removed from the support frame 2, and the step pulley 60 and round belt 59 are assembled on the support frame 2, as heretofore described with respect to FIG. 13. The cylindrical wooden workstock 172 is mounted on the support frame 2, typically by means of the faceplate 93, chuck 89, mandrel 106 or drive spur 103. As the rod crank 115 is rotated to cause both lateral movement of the cutting tool 138 on the cradle frame 110 and simultaneous rotation of the workstock 172, the rotating cutting tool bit 140 or carving bit 151 (FIG. 9) is advanced into contact with the surface of the workstock 172, by clockwise rotation of the frame adjustment knob 130 (FIG. 14), and locked in place by operation of the cradle lock handle 122 (FIG. 15), as heretofore described. The rotating cutting tool bit 140 or carving bit 151 cuts a continuous spiral groove 173 in the surface of the rotating workstock 172, the length of which spiral groove 173 depends on the traversal distance of the cutting tool 138 on the cradle frame 10. It will be appreciated by those skilled in the art that the number of revolutions of the workstock 172 per unit of travel of the cutting tool 138 or flex shaft hand tool 150 (FIG. 9) along the workstock 172 can be varied, as desired, to achieve a spiral groove 173 having a corresponding number of revolutions per unit length of the workstock 172. Accordingly, training the round belt 59 around the outer plate 61 of the pulley 60, as illustrated, is used to achieve a 3:1 revolution ratio of the X-axis lead screw 113 and workstock 172, respectively. This results in the least number of revolutions of the workstock 172 per unit travel of the cutting tool 138 or flex shaft hand tool 150 along the cradle frame 110, and corresponding number of revolutions of the spiral groove 173 per unit length of the workstock 172. Conversely, training the round belt 59 around the inner plate 63 of the pulley 60 is used to achieve a 1:1 revolution ratio of the X-axis lead screw 113 and workstock 172. This results in the greatest number of revolutions of the workstock 172 per unit travel of the cutting tool 138 or flex shaft hand tool 150 and corresponding number of revolutions of the spiral groove 173 per unit length of the workstock 172. Training the round belt 59 around the middle plate 62 of the pulley 60 results in a 2:1 revolution ratio of the X-axis lead screw 113 and workstock 172, respectively, and an intermediate number of revolutions of the spiral groove 173 per unit length of the workstock 172. After the spiral groove 173 has been cut in the workstock 172 as described above, the round belt 59 can he removed from the step pulley 60 or drive pulley 143, twisted to define a "figure 8" configuration, and replaced on the step pulley 60 or drive pulley 143, as desired, such that rotation of the rod crank 115 in the clockwise or counterclockwise direction in each case causes reversal of the direction of rotation of the workstock 172 with respect to that described above. Accordingly, as the rotating cutting tool bit 140 of the cutting tool 138 or carving bit 151 of the flex shaft hand tool 150 contacts the workstock 172 as the workstock 172 is rotated on the support frame 2, coupled with migration of the cutting tool 138 or flex shaft hand tool 150 on the cradle frame 110 by operation of the rod crank 115, a second spiral groove (not illustrated) having the opposite configuration of the previously-formed spiral groove 173 is formed in the workstock 172, thus forming a diamond-shaped pattern in the workstock 172.

As illustrated in FIG. 15, in a still further lathing application of the multi-purpose machining apparatus 1, an initially cylindrical workstock 172 can be typically cut into a cone-shaped or tapered configuration. The workstock 172 is mounted on the support frame 2 typically between the drive spur 103, mounted in the head 85 of the headstock 83 and which engages the drive end of the workstock 172, and the live center spur 33 of the compression tensioner 24, which engages the live center end of the workstock 172. The cradle frame 110 is initially angled along the X-axis of the support frame 2 by loosening the frame adjustment handles 144; shifting the lefthand end of the cradle frame 110 rearwardly and the righthand end of the cradle frame 110 forwardly on the respective frame arms 6, as illustrated, or the lefthand end of the cradle frame 110 forwardly and the righthand end of the cradle frame 110 rearwardly; and tightening the frame adjustment handles 144. Additionally, the taper stops 9 are adjusted in the respective cutter flame adjustment slots 8, by loosening the respective stop bolts 9a; sliding the taper stops 9 against the rear ends of the respective taper blocks 111; and tightening the stop bolts 9a. The workstock 172 is rotated on the support frame 2, typically by means of either the drive tool 76 described above with respect to FIG. 10, or the step pulley 60 described above with respect to FIG. 11. As the rotating cutting drill bit 140 or carving bit 151 is advanced along the Y-axis of the multi-purpose machining apparatus 1 into contact with the workstock 172, the workstock 172 is rotated on the support frame 2 by operation of the drive tool 76 or step pulley 60, and the cutting tool 138 or flex shaft hand tool 150 is gradually advanced along the X-axis of the multi-purpose machining apparatus 1 by operation of the rod crank 115. The cutting drill bit 140 or carving bit 151 thus shapes a taper in the workstock 172 along the length thereof, which corresponds to the taper angle of the cradle frame 110 on the support frame 2.

Figure 26:
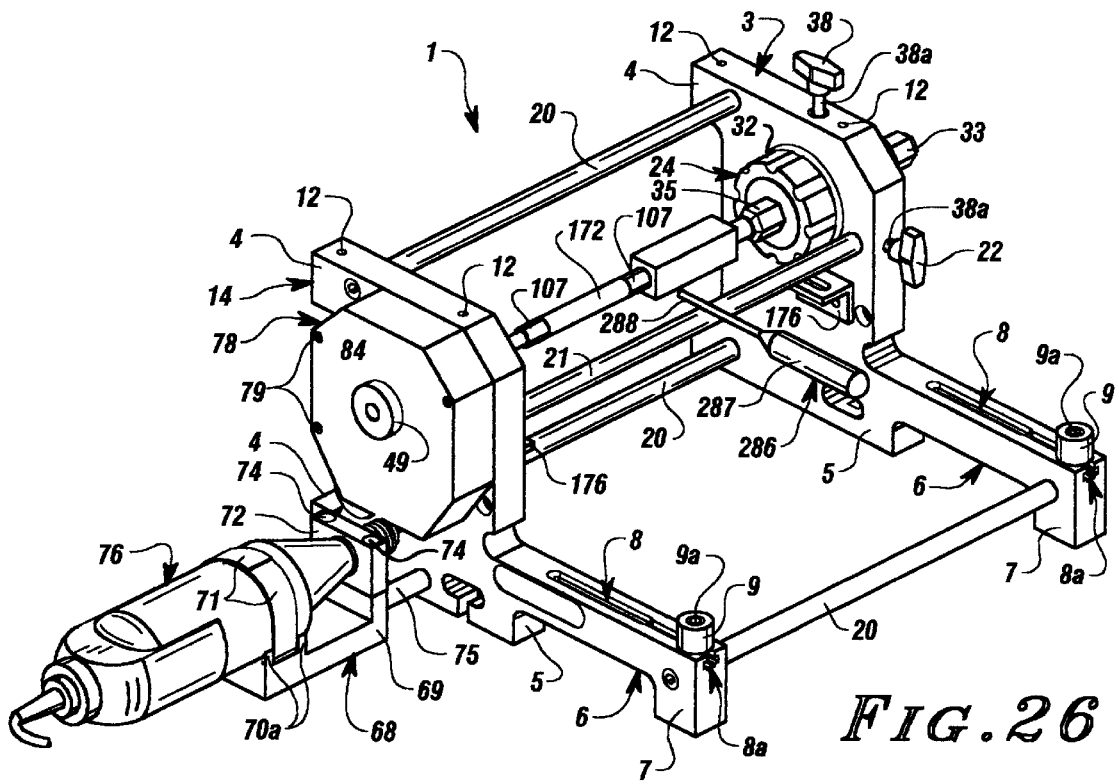
FIG. 26 is a perspective view of the multi-purpose machining apparatus, with the support frame resting in a horizontal position and the cradle frame and cutting tool illustrated in FIG. 8 removed from the support frame, more particularly illustrating mounting of a workstock on the support frame using a mandrel, and shaping of the workstock on the apparatus using a hand-held cutting tool resting on the "steady rest"

Referring again to FIGS. 1, 3 and 9 and to FIG. 26 of the drawings, in still another lathing application of the multi-purpose machining apparatus 1, a wooden workstock 172 can be mounted on the support frame 2 typically by means of a mandrel 106. After the mandrel 106 has been mounted on the support frame 2 and the wooden workstock 172 has been mounted on the mandrel 106, as described above with respect to FIG. 3, various lathing operations can be applied to the rotating workstock 172 using the hand-held cutting tool 286, as illustrated in FIG. 26, the rotary cutting tool 138, as illustrated in FIG. 1, or the flex shaft hand tool 150, illustrated in FIG. 9. After completion of the lathing operation, the workstock 172 is removed from the support frame 2, typically by rotating the mandrel nut 35 in the counterclockwise direction to remove the workstock 172 from the mandrel shaft 108, removing the compression tensioner 24 from the compression tensioner bushing 81 and removing the workstock 172 from the mandrel shaft 108 through the bushing bore 82a of the compression tensioner bushing 81. The mandrel 106 is removed from the headstock 83, as desired, by unthreading the allen screw (not illustrated) from the allen screw opening 87 of the headstock head 85, and removing the drive end 108b of the mandrel shaft 108 from the headstock 83.

Figure 27:
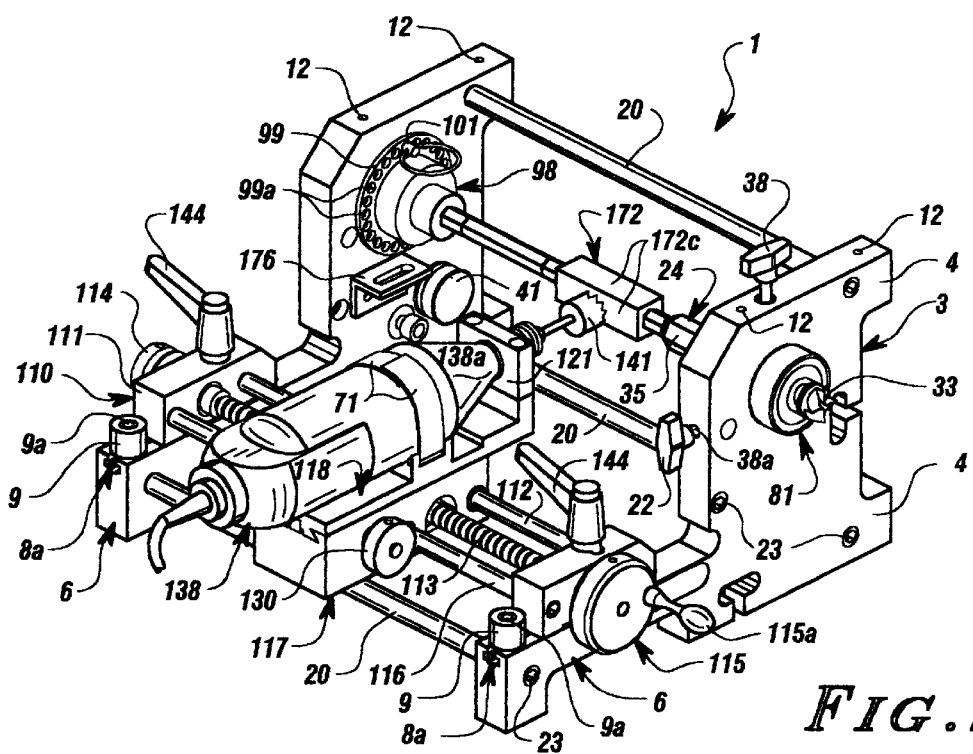
FIG. 27 is a perspective view of the multi-purpose machining apparatus, with the support frame resting in a horizontal position, more particularly illustrating mounting of a workstock on the support frame using a mandrel and an index head and shaping the workstock using the rotary cutting tool.

Referring next to FIG. 27 of the drawings, a metal or wooden workstock 172 can be mounted on the mandrel 106 (FIG. 3), and multiple flat surfaces 172c lathed in the workstock 172 by operation of the index head 98, as heretofore described with respect to FIG. 14. The mandrel shaft 108 (FIG. 3) is initially mounted in the headstock 83, and the index head 98 is mounted on the head 85 of the headstock 83, typically using an allen screw (not illustrated), as heretofore described. After the workstock 172 is positioned on the mandrel shaft 108, typically through the bushing bore 82a (FIG. 3) of the compression tensioner bushing 81, the compression tensioner 24 is mounted in the bushing bore 82a and the workstock 172 is compressed on the mandrel 106 between the index head 98 and mandrel nut 35 of the compression tensioner 24, by threading the mandrel nut 35 on the mandrel shaft 108. The workstock 172 is prevented from rotating on the mandrel 106 by inserting the indexing pin through a selected index opening 99a in the index head 98 and through the registering index lock opening 102 (FIG. 3), as heretofore described with respect to FIG. 14. Rotation of a scoring spur 141 against the workstock 172 by operation of the cutting tool 138, and intermittent rotation and locking of the index head 98 as heretofore described with respect to FIG. 14, facilitates cutting multiple flat surfaces 172c in the workstock 172.

Referring again to FIGS. 8 and 9 and to FIGS. 28 and 29 of the drawings, a tool post attachment, generally illustrated by reference numeral 290, can be attached to substantially any type of existing lathing apparatus (not illustrated) for facilitating various lathing operations on a workstock 172, removably mounted on the apparatus. The tool post attachment 290 includes an elongated attachment plate 291, which includes a pair of cradle bolt openings 292 adjacent to respective ends thereof, and a central support bolt opening 294. The attachment plate 291 is mounted on an attachment support 295, typically by means of a support attachment bolt 296, which is extended downwardly through the central support bolt opening (not illustrated) provided in the attachment plate 291, and threaded into a support opening 295a, provided in the upper end of the attachment support 295. The bottom end of the attachment support 295 is secured to a conventional, height-adjustable receiver (not illustrated) of a lathing apparatus (also not illustrated), by means of a suitable attachment mechanism (not illustrated) known to those skilled in the art. A cradle frame 110 as described above with respect to FIG. 8, is removably mounted on the attachment plate 291, typically by means of cradle mount bolts 293, which are extended upwardly through the respective cradle bolt openings 292 of the attachment plate 291 and through respective handle openings 111 a (provided in the respective taper blocks 111 of the cradle frame 110). A frame adjustment handle 144 is threaded on each cradle mount bolt 293 and tightened against the corresponding taper block 111 to secure the cradle frame 10 on the attachment plate 291. A rotary cutting tool 138 can typically be mounted on the cutting tool mount cradle 119 by threading the nose 138a of the cutting tool 138 through the central block opening (not illustrated) of the cutting tool mount block 159 of the cutting tool mount cradle 119 and fastening the mount straps 71 around the cutting tool 138, as heretofore described with respect to FIG. 8. Alternatively as illustrated in FIG. 9, the handle 157 of a flex shaft hand tool 150 can be mounted on the cutting tool mount cradle 119. This is accomplished by initially removing the cutting tool mount block 159 from the plate flange 120 of the cradle plate 118 by removal of the block mount bolts 74, and mounting the hand tool mount block 121 on the plate flange 120 by means of the block mount bolts 74, as heretofore described with respect to FIG. 9. A cylindrical hand tool adaptor 155 is fitted on the cradle plate 118, and the hand tool nose 158 of the handle 157 is extended through the mount opening 156 of the hand tool adaptor 155 and registering block opening 121a of the hand tool 121, and the set screw 77 threaded through the set screw opening 77a and into contact with the hand tool nose 158.

In typical operation of the tool post attachment 290, as the workstock 172 is rotated on the lathing apparatus in conventional fashion, the cutting tool 138 flex shaft hand tool 150, or alternative tool known to those skilled in the art, which is mounted on the cradle plate 118 of the cutting tool mount cradle 119, is advanced along the Y-axis of the lathing apparatus by operation of the frame adjustment knob 130 (FIG. 9), and the rotating cutting tool bit 140 of the rotary cutting tool 138 or the rotating carving bit 151 of the flex shaft hand tool 150 contacts the workstock 172. The cradle plate 118 is typically locked in the forward position by operation of the cradle lock handle 122, as heretofore described. As the cutting tool mount cradle 119 is caused to migrate along the X-axis of the lathing apparatus on the front cradle frame rod 112 and rear cradle frame rod 116 of the attachment frame 291 by rotation of the rod crank 115, the cutting tool bit 140 or carving bit 151 shapes the workstock 172 along the points of contact of the cutting tool bit 140 or carving bit 151 with the workstock 172, as heretofore described with respect to the various lathing applications of the multi-purpose machining apparatus 1. It is understood by those skilled in the art that by loosening the attachment support 295 in the receiver (not illustrated) of the lathing apparatus, angling the attachment plate 291 with respect to the center axis of the lathe and tightening the attachment support 295 in the receiver, a taper can be shaped in the workstock 172 by means of the migrating cutting tool 138, as heretofore described with respect to FIG. 15.

Referring next to FIGS. 22 and 23 of the drawings, the multi-purpose machining apparatus 1 is capable of use as a saw for performing a variety of saw operations, as hereinafter described. Accordingly, a typically rectangular saw table 260 is removably mounted on the live center end plate 3 and drive end plate 14 of the support frame 2, as hereinafter described. A circular saw blade 267 extends through a saw blade slot 266, provided in substantially the center of the saw table 260, and a blade drive shaft (not illustrated), connected to the saw blade 267, extends beneath the saw table 260 and terminates in a drive pulley housing 265, provided on the rear edge of the saw table 260 at substantially the midpoint thereof. A pair of longitudinal guide slots 261 is typically provided in the surface of the saw table 260, in parallel, spaced-apart relationship, for purposes which will be hereinafter described. The saw table 260 is removably mounted on the support frame 2, typically by extending multiple table mount bolts 264 through respective table mount bolt openings 263, provided in the saw table 260, and threading the table mount bolts 264 into respective registering saw table mount bolt openings 12 (FIG. 3), provided in spaced-apart relationship in the upper surface of the live center end plate 3 and drive end plate 14, respectively. As illustrated in FIG. 23, the rotary cutting tool 138 is typically removably mounted directly on the cradle mount block 117 of the cutting tool mount cradle 119, with the cradle plate 118 removed from the cradle mount block 117. A pinion shaft 53 is mounted in the tool chuck 76*b* in the nose 138*a* of the cutting tool 138, and a blade drive pulley 274 is removably mounted on the pinion shaft 53, typically by threading a set screw 277 through a set screw opening (not illustrated), provided in the blade drive pulley 274, and tightening the set screw 277 against the pinion shaft 53. A blade drive belt 275 is trained around a drive pulley (not illustrated) provided in the drive pulley housing 265, on the end of the blade drive shaft (not illustrated), and seated in a belt groove 274, provided circumferentially in the blade drive pulley 274. Accordingly, operation of the cutting tool 138 causes rotation of the pinion shaft 53, which transmits rotation to the saw blade 267 through the blade drive pulley 274, blade drive belt 275, drive pulley (not illustrated) and drive shaft (not illustrated).

Referring again to FIGS. 22 and 23 of the drawings, in typical sawing operation of the multi-purpose machining apparatus 1, the saw table 260 is initially mounted on the live center end plate 3 and drive end plate 14 of the support frame 2 by means of the table mount bolts 264, as heretofore described. After the cradle plate 118 (FIG. 9) is removed from the cradle mount block 117, the cradle mount block 117 is positioned at approximately the center of the cradle frame 110, by rotation of the rod crank 115. The pinion shaft 53, with the blade drive pulley 274 mounted thereon, is mounted in the nose 138*a* of the rotary cutting tool 138. The blade drive belt 275 is trained around the blade drive pulley (not illustrated, provided inside the drive pulley housing 265 on a blade drive shaft which engages the saw blade 267) and the belt groove 274*a* of the blade drive pulley 274. Accordingly, operation of the cutting tool 138 causes rotation of the saw blade 267 in the saw blade slot 266, as heretofore described. A wooden workstock (not illustrated) such as a segment of molding or the like, is placed on the saw table 260 and pushed against the rotating saw teeth (not illustrated) of the saw blade 267, to facilitate cutting the molding or other workstock, in conventional fashion. As further illustrated in FIG. 22, a fence 269, typically characterized by an elongated guide block 270 and a substantially semicircular guide head 271, mounted on one end of the guide block 270 by means of a guide bolt 272, can be used to guide the workstock (not illustrated) against the saw blade 267. The guide head 271 can be adjusted in substantially perpendicular relationship with respect to the guide block 270, by loosening the guide bolt 272, positioning the guide head 271 on the guide block 270 and tightening the guide bolt 272 against the guide head 271, to facilitate making straight, uniform cuts, as desired, in the workstock. Accordingly, the guide block 270 of the fence 269 is inserted in one of the guide slots 261, as illustrated, and the board or other workstock is placed on the saw table 260, against the flat surface 271*a* of the guide head 271. As the fence 269 is pushed along the X-axis of the multi-purpose machining apparatus 1, in the guide slot 261, the guide head 271 pushes the workstock against the rotating saw blade 267. Due to the guiding action of the guide slot 261 on the guide block 270, the guide head 271 maintains the workstock in a substantially perpendicular relationship to the cutting plane of the saw blade 267 throughout the cutting operation, resulting in a uniform cut in the workstock. Alternatively, the guide head 271 can be adjusted at a selected angle with respect to the guide block 270, in similar fashion, to facilitate straight, angled cutting of the workstock, as desired.

Figure 17:
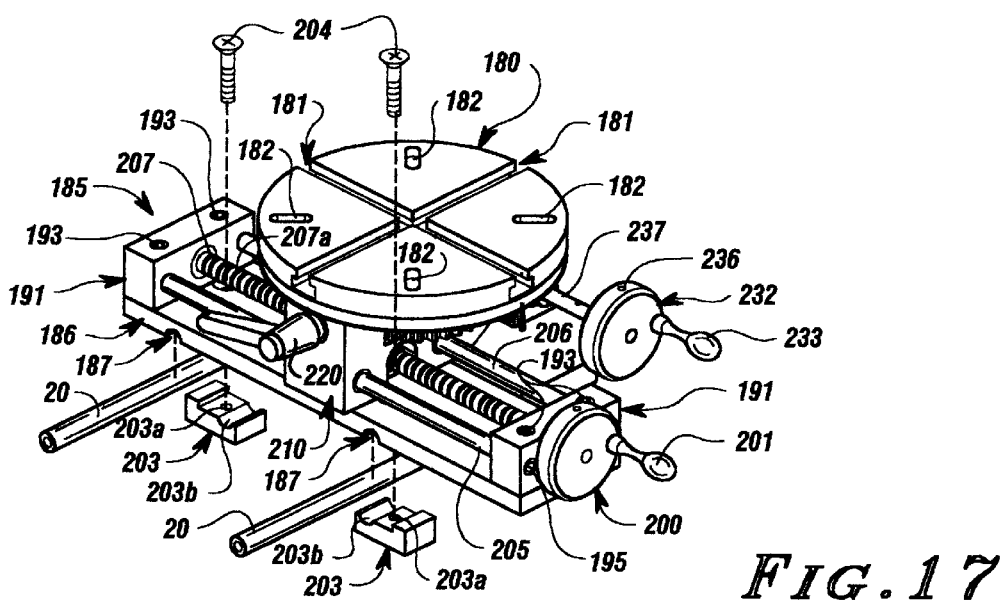
FIG. 17 is a perspective view of a milling frame component of the multi-purpose machining apparatus, more particularly illustrating a preferred bracket technique for removably attaching the milling frame to the support frame in typical milling or drilling application of the apparatus.
Figure 20:
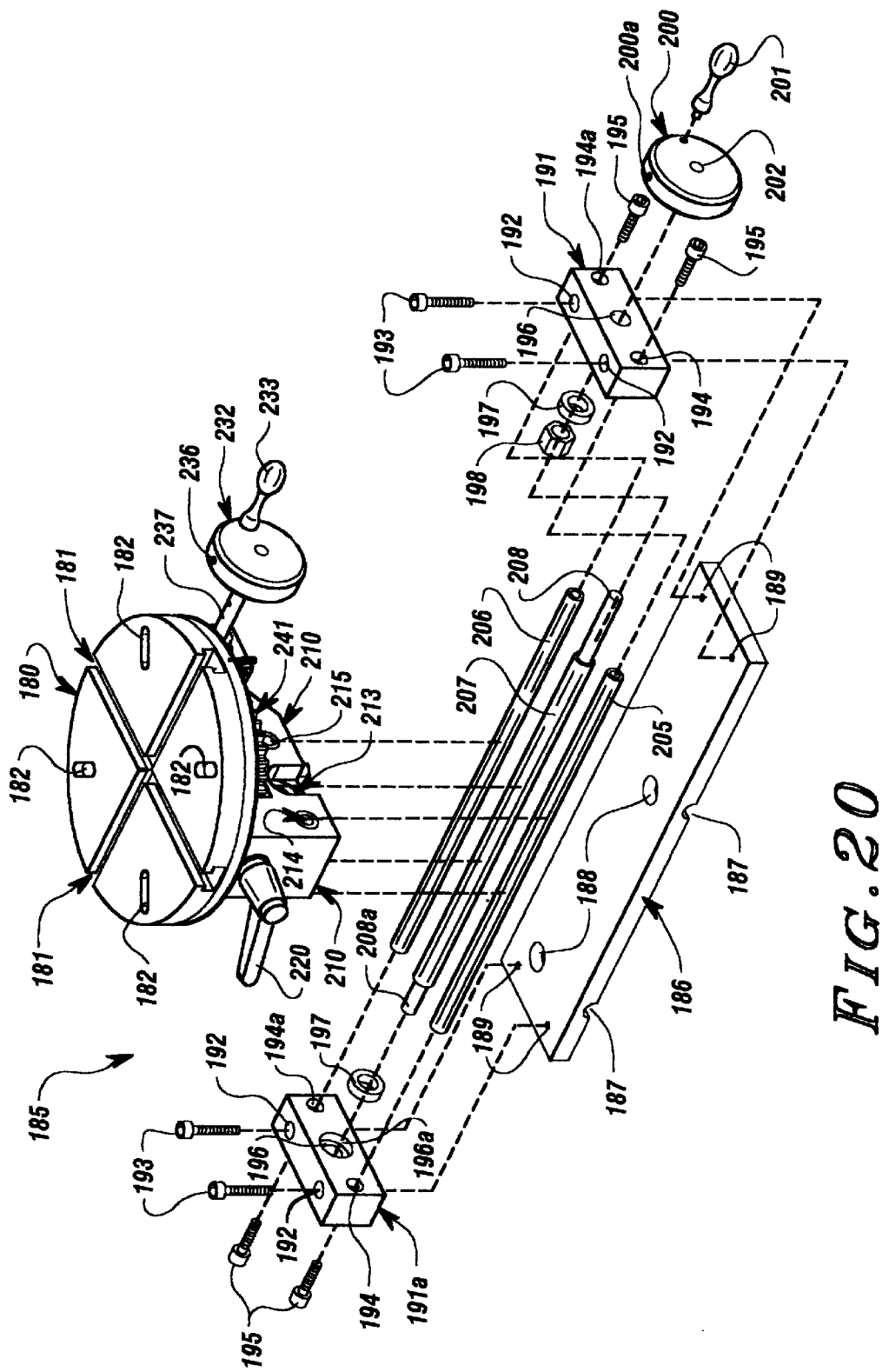
FIG. 20 is an exploded, perspective view of the milling frame illustrated in FIG. 17.

Referring next to FIGS. 17–20 of the drawings, the multi-purpose machining apparatus 1 of this invention is capable of use as a milling machine, as particularly illustrated in FIGS. 18 and 19. Accordingly, as hereinafter further described, the support frame 2 of the multi-purpose machining apparatus 1 is supported in a vertical position on a suitable supporting surface (not illustrated), by means of the vertical, spaced-apart support legs 4 of the live center end plate 3 and drive end plate 14, respectively. A milling frame 185, fitted with a typically circular rotary table 180, is removably mounted on the vertical support frame 2, typically by means of a pair of milling frame mount clamps 203, as illustrated in FIG. 17 and hereinafter described. The rotary table 180 mounts a workstock 183 which is shaped, cut or otherwise dressed by operation of the now vertical cutting tool 138, mounted on the cutting tool mount cradle 119 as heretofore described, in typical milling operation of the multi-purpose machining apparatus 1 as hereinafter described. As illustrated in FIGS. 17 and 20, the milling frame 185 typically includes an elongated, typically rectangular milling frame plate 186. An elongated, typically rectangular, front milling frame block 191 and a similar, rear milling frame block 191*a*, are mounted on the top surface of the milling frame plate 186, at respective ends thereof. Accordingly, a pair of block mount bolts 193 typically extends through respective block mount openings 192, provided in the front milling frame block 191 and rear milling frame block 191*a*, respectively, and each is threaded through a frame block mount opening 189, provided in the milling frame plate 186. As further illustrated in FIG. 20, a left rod mount opening 194 and a right rod mount opening 194*a* extend transversely through the front milling frame block 191 and rear milling frame block 191*a*, respectively, adjacent to the respective left and right ends of each. A left guide rod or shaft 205 is inserted in the left rod mount openings 194 of the respective front milling frame block 191 and rear milling frame block 191*a*, and is typically secured therein by means of rod mount bolts 195, which are extended through the left rod mount openings 194, threaded into the respective ends of the left guide rod 205 and tightened against a bolt seat (not illustrated), recessed in each left rod mount opening 194. A right guide rod or shaft 206 is likewise mounted in the right rod mount openings 194*a* of the respective front milling frame block 191 and rear milling frame block 191*a*. A middle rod opening 196 extends transversely through the front milling frame block 191 and rear milling frame block 191*a*, respectively, between the left rod mount opening 194 and right rod mount opening 194*a*. A rod bearing 197 is seated in each middle rod opening 196, against a bearing shoulder 196*a*, recessed in each middle rod opening 196. The rear tapered end 208*a* of an elongated Y-axis lead screw 207, provided with multiple screw threads 207*a*, as illustrated in FIG. 17, is rotatably seated in the rod bearing 197 of the rear milling frame block 191*a*. The front tapered end 208 of the Y-axis lead screw 207 extends through the rod bearing 197 of the front milling frame block 191, and protrudes from the front face of the front milling frame block 191, where the front tapered end 208 extends through a crank opening 202 of a frame adjustment crank 200, fitted with a crank handle 201. The frame adjustment crank 200 is mounted on the front tapered end 208 of the Y-axis lead screw 207, typically by means of a set screw (not illustrated), threaded through set screw opening 200a provided in the frame adjustment crank 200 and tightened against the front tapered end 208 of the Y-axis lead screw 207. The rotary table 180 is mounted for forward and reverse adjustment on the left guide rod 205 and right guide rod 206 of the milling frame 185, along the Y-axis of the multi-purpose machining apparatus 1, by clockwise or counterclockwise rotation of the frame adjustment crank 200, as hereinafter further described. As further illustrated in FIG. 17, a pair of plate channels 187 is shaped in the bottom surface of the milling frame plate 186, in substantially parallel, spaced-apart relationship with respect to each other. The milling frame 185 is removably mounted on the bottom most fixed tie rods 20 of the vertical support frame 2, by initially resting the milling frame plate 186 on the parallel tie rods 20 at the plate channels 187. As the milling frame mount clamps 203 are held against the tie rods 20 at the tie rod grooves 203b of the respective milling frame mount clamps 203, milling frame mount bolts 204 are typically extended downwardly through clamp bolt openings 188 (FIG. 20), provided in the milling frame plate 186 and registering clamp mount bolt openings 203a provided in the milling frame mount clamps 203, and a nut (not illustrated) is threaded on each milling frame mount bolt 204 and tightened against the corresponding milling frame mount clamp 203.

Figure 21:
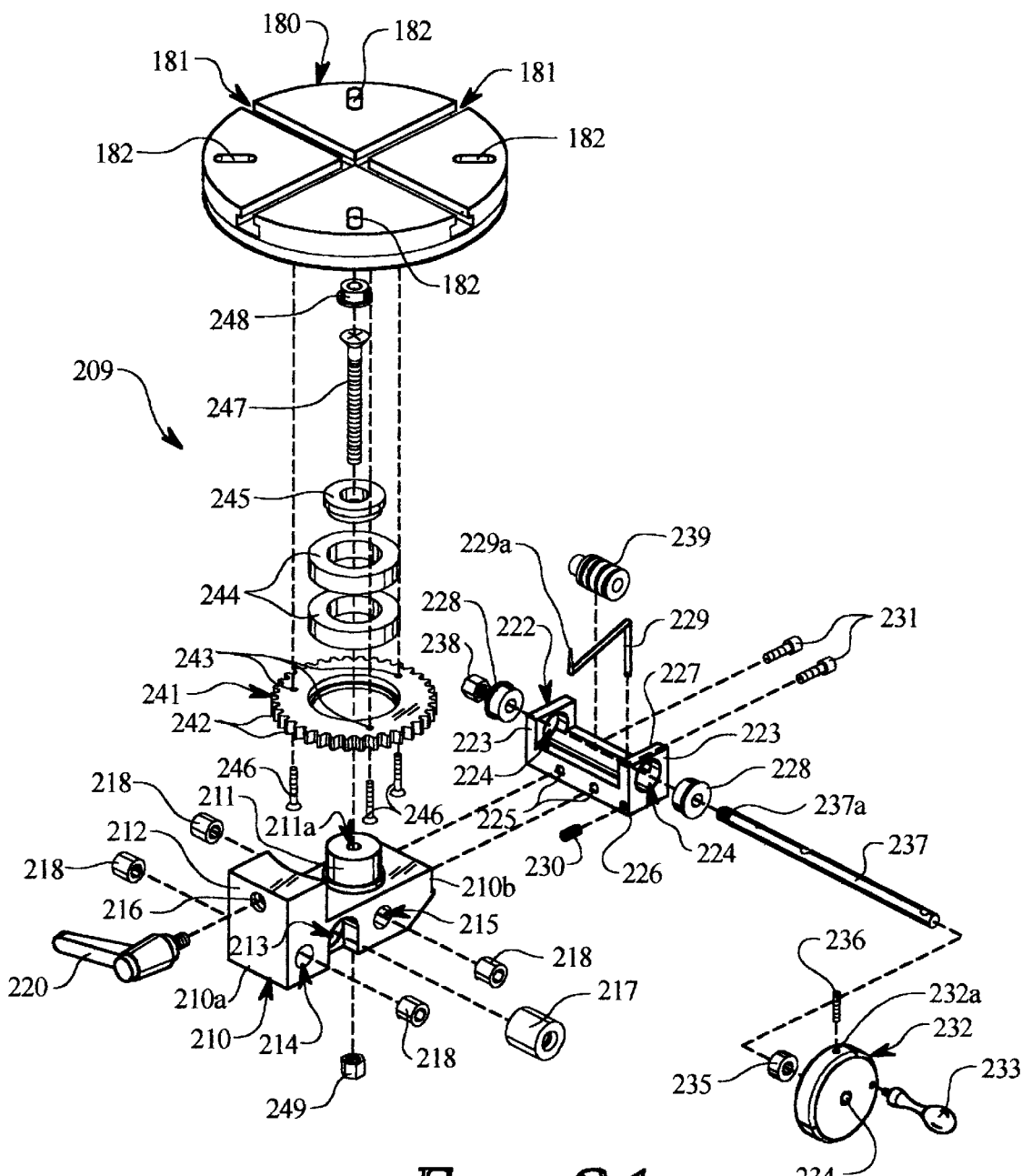
FIG. 21 is an exploded, perspective view of a rotary table assembly of the milling frame.

Referring next to FIGS. 17, 20 and 21 and particularly to FIG. 21 of the drawings, a rotary table assembly 209 is mounted on the milling frame 185 to facilitate selectively rotating the rotary table 180 on the milling frame 185, as hereinafter described. A pair of intersecting, diametrically-extending T channels 181 is typically provided in the surface of the rotary table 180, which T channels 181 typically divide the rotary table 180 into quadrants. A bolt slot 182 is provided in the surface of the rotary table 180, typically in each quadrant thereof, the purpose of which bolt slots 182 and T channels 181 will be hereinafter described. The rotary table assembly 209 includes an elongated table base 210, having an upwardly-extending base flange 212 at one end thereof and an upward-standing, cylindrical table support 211, provided on the upper surface of the table base 210, adjacent to the base flange 212. A left rod opening 214 and a right rod opening 215, each of which receives a cylindrical guide bushing 218, extend transversely through the table base 210, in spaced-apart relationship to each other. A lead screw opening 213 extends transversely through the table base 210, between the left rod opening 214 and right rod opening 215, and receives a cylindrical acme lead screw nut 217. A threaded lock opening 216 is provided in the flange end 210a surface of the table base 210, at the base flange 212, and receives a rotary table lock handle 220, the purpose of which will be hereinafter described. As illustrated in FIG. 20, the left guide rod 205 of the milling frame 185 extends through the left rod opening 214, and the right guide rod 206 of the milling frame 185 extends through the right rod opening 215, of the table base 210. The threaded Y-axis lead screw 207 extends through the interiorly-threaded acme lead screw nut 217, provided in the lead screw opening 213. Rotation of the frame adjustment crank 200 causes rotation of the Y-axis lead screw 207 and bidirectional movement of the table base 210 on the left guide rod 205 and right guide rod 206, depending on the direction of rotation of the frame adjustment crank 200, due to engagement of the exterior screw threads 207a of the Y-axis lead screw 207 with the interior nut threads (not illustrated) of the acme lead screw nut 217.

As further illustrated in FIG. 21, the cylindrical table support 211 of the table base 210 receives a gear 241, fitted with multiple gear teeth 242, in addition to a pair of gear bearings 244, the bottom of which is recessed in the worm gear 241. A bearing cap 245 seats in the top gear bearing 244, and a table retainer bolt 247 extends downwardly through the bearing cap 245, gear bearings 244 and a central support opening 211a, provided in the table support 211. A retainer nut 249 is threaded on the table retainer bolt 247 and tightened against the bottom surface of the table base 210, to firmly seat the retainer bolt 247 in the bearing cap 245 and the bearing cap 245 and gear bearings 244 on the table base 210. A threaded insert 248 is typically press-fitted in an insert seat (not illustrated), provided in the bottom surface of the rotary table 180, at substantially the center thereof, the purpose of which threaded insert 248 will be hereinafter described. Multiple gear mount bolts 246 extend upwardly through respective gear bolt openings 243, provided in the worm gear 241, and thread into respective bolt openings (not illustrated), provided in the bottom surface of the rotary table 180. A worm housing 222 is mounted on the tapered end 210b of the table base 210, typically by means of a pair of crank frame mount screws 231 which extend through respective housing mount openings 225, provided in the worm housing 222, and thread into registering mount screw openings (not illustrated), provided in the table base 210. A worm housing flange 223 is provided at each end of the worm housing 222, and a worm shaft opening 224 extends through each worm housing flange 223, each of which worm shaft openings 224 receives a worm shaft bearing 228. An elongated worm shaft 237 receives a worm 239, which is secured to the worm shaft 237 typically by means of a spring pin (not illustrated), in conventional fashion. The worm shaft 237 extends through the respective worm shaft bearings 228, with the worm 239 positioned between the worm housing flanges 223, and the worm 239 meshes with the gear teeth 242 of the worm gear 241, for purposes which will be hereinafter described. A backlash nut 238 is threaded on shaft threads 237a, provided on one end of the worm shaft 237. A table rotation crank 232, fitted with a crank handle 233, is mounted on the opposite end of the worm shaft 237, which terminates inside a set collar 235, seated in the central crank opening 234 of the table rotation crank 232. A collar set screw 236 is typically threaded through a set screw opening 232a, provided in the table rotation crank 232, and tightened against the worm shaft 237, through a collar opening (not illustrated) provided in the set collar 235.

In typical milling application of the multi-purpose machining apparatus 1, rotation of the table rotation crank 232 causes rotation of the worm shaft 237, worm 239 and meshing worm gear 241, and clockwise or counterclockwise rotation of the rotary table 180 on the table base 210, depending on the direction of rotation of the table rotation crank 232. A degree pointer 229 is typically removably secured in a plate rod opening 227, provided in one of the worm housing flanges 223, by means of a set screw 230, which is threaded into a set screw opening 226, disposed in communication with the plate rod opening 227. The degree pointer 229 includes a pointer tip 229a, which is typically used in conjunction with a degree indicator strip (not illustrated), provided around the perimeter of the rotary table 180, to indicate the degrees of rotation of the rotary table 180 with respect to a starting point of the rotary table 180, in typical milling application of the multi-purpose machining apparatus 1 as hereinafter described.

Referring again to FIGS. 18 and 19 of the drawings, in typical milling application of the multi-purpose machining apparatus 1, the milling frame 185 is initially removably mounted on the support frame 2, typically by means of the milling frame mount clamps 203, as heretofore described with respect to FIG. 17. A milling bit 184 of selected size and design is mounted in the tool chuck 76b of the nose 138a of the rotary cutting tool 138, which is then removably mounted on the vertical cutting tool mount cradle 119, typically by means of the cutting tool mount block 159 and mount straps 71, as heretofore described with respect to FIG. 8. A workstock 183 is mounted on the rotary table 180, using any of a variety of suitable hold-down techniques which are well-known to those skilled in the art. The rotary table 180 is adjusted on the left guide rod 205 and right guide rod 206 of the milling frame 185, in either direction along the Y-axis of the multi-purpose machining apparatus 1, by rotating the frame adjustment crank 200 in the clockwise or counter-clockwise direction, until the workstock 183 is located at the desired position with respect to the milling bit 184 of the cutting tool 138. The cradle plate 118 and attached cutting tool 138 are lowered on the cradle mount block 117 of the cutting tool mount cradle 119 along the Z-axis of the multi-purpose machining apparatus 1, by unlocking the cradle lock handle 122 and then rotating the frame adjustment knob 130 until the rotating milling bit 184 contacts the workstock 183. The cradle lock handle 122 is then again locked to secure the cradle plate 118 and cutting tool 138 in position on the cradle mount block 119. As the milling bit 184 is rotated by operation of the cutting tool 138, the rotary table 180 can be rotated in the clockwise or counterclockwise direction, as desired, by rotating the table rotation crank 232 to alter the position of the workstock 183 with respect to the milling bit 184. After the desired shaping, cutting or dressing of the workstock 183 has been accomplished, operation of the cutting tool 138 is terminated, and the cradle plate 118 and attached cutting tool 138 are raised along the Y-axis by unlocking the cradle lock handle 122, rotating the frame adjustment knob 130 and again locking the cradle lock handle 122 with the cutting tool 138 at the raised position. The workstock 183 is then removed from the rotary table 180. Under circumstances in which it is desired to center a workstock 183 on the rotary table 180, a center bolt (not illustrated) can be extended through the workstock 183 and into a central table opening (not illustrated) provided in the center of the rotary table 180, and threaded through the threaded insert 248 (FIG. 21, seated in the rotary table 180), in conventional fashion.

It will be apparent to those skilled in the art that a milling configuration of the multi-purpose machining apparatus 1 can be used for performing drilling operations on a workstock 183, as desired, by mounting a drill bit (not illustrated) in the tool chuck 76b of the nose 138a of the cutting tool 138. Accordingly, by operation of the frame adjustment knob 130, the rotating drill bit of the cutting tool 138 is lowered along the Z-axis of the multi-purpose machining apparatus 1 into contact with the workstock 183 and then raised, to facilitate drilling an opening in the workstock 183. The position of the workstock 183 with respect to the drill bit can be changed by rotating the rotary table 180 using the table rotation crank 232, as heretofore described.

Referring next to FIGS. 24 and 25 of the drawings, the multi-purpose machining apparatus 1 of this invention is also capable of use as a router. Accordingly, an elongated, typically rectangular router table 280 can be mounted on the rotary table 180 (rotatably mounted on the support frame 2 as heretofore described with respect to FIG. 18), as illustrated in FIGS. 24 and 25. Alternatively, the router table 280 can be mounted directly on the live center end plate 3 and drive end plate 14 of the vertical support frame 2 and used as a trim table, as hereinafter described. A router bit 284 of selected diameter and profile is mounted in the tool chuck 76b in the nose 138a of the rotary cutting tool 138, to facilitate various trimming or routing operations on a workstock (not illustrated) as the workstock rests on the router table 280, as hereinafter described. A pair of table walls 282 typically extends perpendicularly from the rear edge of the router table 280, the table walls 282 typically separated by a bit space 281a. A longitudinal X-axis guide channel 281 is typically provided in the router table 280, for purposes which will be hereinafter described. In typical routing application of the multi-purpose machining apparatus 1, the router table 280 is mounted on the rotary table 180 (mounted on the support frame 2 as described with respect to FIG. 18), typically by extending router table mount bolts 283 upwardly through the respective bolt slots 182 (FIG. 21) provided in the rotary table 180, and threading the router table mount bolts 283 into registering bolt openings (not illustrated), provided in the bottom surface of the router table 280. When the router table 280 is used as a trim table as hereinafter described, the router table 280 is removably mounted on the support frame 2, typically by extending table mount bolts (not illustrated) through bolt openings (not illustrated) provided in the router table 280, and threading the mount bolts into registering frame bolt openings (not illustrated), provided in the live center end plate 3 and drive end plate 14, respectively, of the support frame 2.

Referring again to FIGS. 24 and 25 of the drawings, in typical routing application of the multi-purpose machining apparatus 1, the router table 280 is removably mounted on the rotary table 180 by means of the router table mount bolts 283, as heretofore described. Accordingly, the position of the router table 280 can be adjusted along the Y-axis of the multi-purpose machining apparatus 1 by Y-axis migration of the rotary table 180 on the milling frame 185, facilitated by rotation of the frame adjustment crank 200, as heretofore described in FIG. 18 with respect to the rotary table 180. The router bit 284 is mounted in the nose 138a of the rotary cutting tool 138, and the cutting tool 138 is mounted on the cutting tool mount cradle 119, as heretofore described. After the workstock (not illustrated), such as a plate, panel or molding segment is secured on the router table 280 according to the knowledge of those skilled in the art, the cradle plate 118 and mounted cutting tool 138 are lowered along the Z-axis on the cradle mount block 117 of the cutting tool mount cradle 119, by operation of the frame adjustment knob 130 (FIG. 18), until the router bit 284 is typically initially located in the bit space 282a of the router table 280. The cradle lock handle 122 is used to lock the cradle plate 118 on the cradle mount block 117 and secure the rotary cutting tool 138 in position, as heretofore described. As the router bit 284 is rotated by operation of the stationary cutting tool 138, the router table 280 and attached workstock can be caused to migrate along the Y-axis of the multi-purpose machining apparatus 1 by rotation of the frame adjustment crank 200, until the workstock contacts the rotating router bit 284. Continued Y-axis migration of the router table 280 and mounted workstock facilitates cutting a straight slot or groove (not illustrated) in the workstock, along the Y-axis path of the router bit 284, through the workstock. It will be appreciated by those skilled in the art that a curved slot or groove (not illustrated) of selected configuration can be cut in the workstock, as desired. This is accomplished by migration of the router table 280 along the Y-axis by rotation of the frame adjustment crank 200, with simultaneous X-axis migration of the cutting tool mount cradle 119 and attached cutting tool 138 in the selected direction by clockwise or counterclockwise rotation of the rod crank 115.

In another application of the multi-purpose machining apparatus 1, the router table 280 is capable of use as a trim table. The milling frame 185 and attached rotary table 180 are from the support frame 2, the router table 280 is mounted directly on the live center end plate 3 and drive end plate 14 of the vertical support frame 2, as heretofore described. After the workstock (not illustrated) is mounted on the router table 280, the cutting tool mount cradle 119 is caused to migrate along the X-axis of the multi-purpose machining apparatus 1 by rotation of the rod crank 115, as the rotating router bit 284 cuts a straight path through the workstock throughout the length thereof. Alternatively, a slot or groove can be cut in the workstock by sliding the guide block 270 of a board guide 269, described above with respect to FIG. 22, along the X-axis guide channel 281 of the router table 280, as illustrated in FIG. 24, with the flat surface 271a of the guide head 271 pushing the workstock against the router bit 284.

Figure 28:
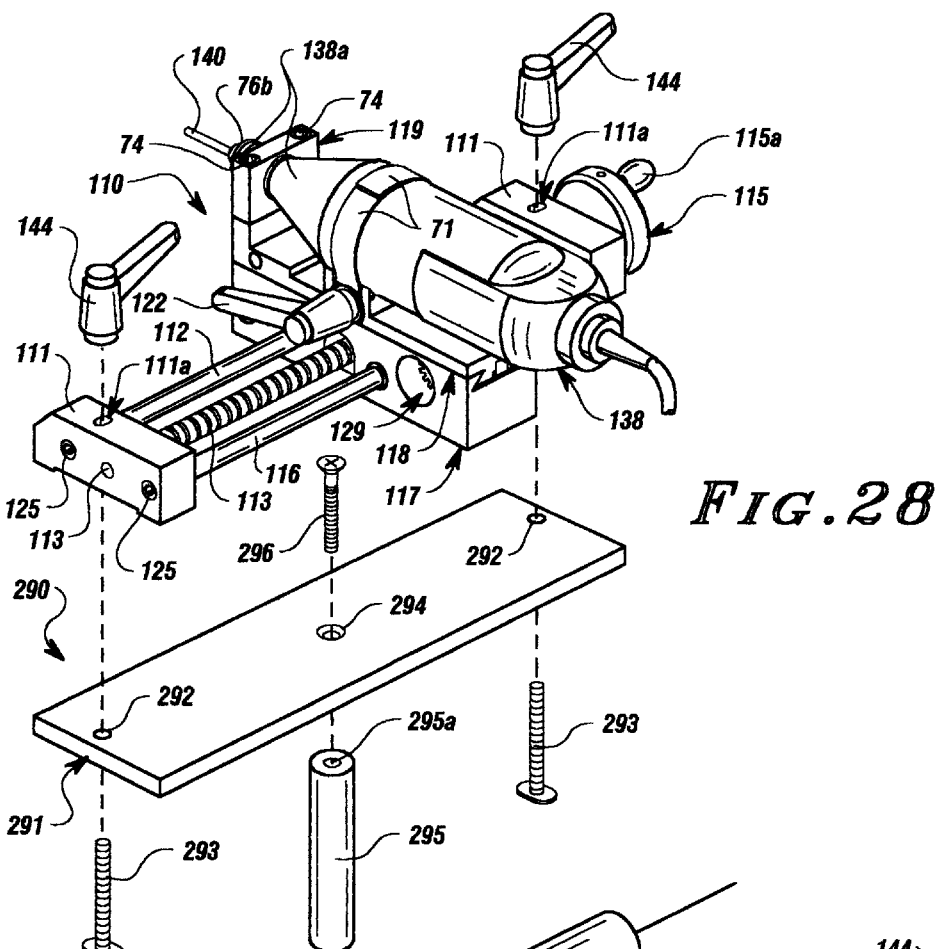
FIG. 28 is an exploded, perspective view of a tool post attachment embodiment of the cutting tool mount cradle illustrated in FIG. 9.
Figure 29:
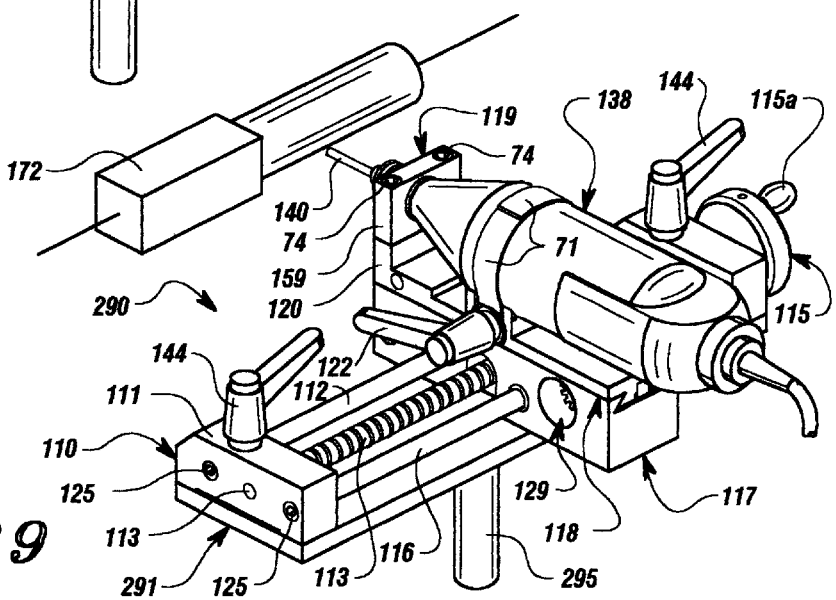
FIG. 29 is a perspective view of the tool post attachment illustrated in FIG. 28, mounted on a conventional lathing apparatus (not illustrated)
Figure 30:
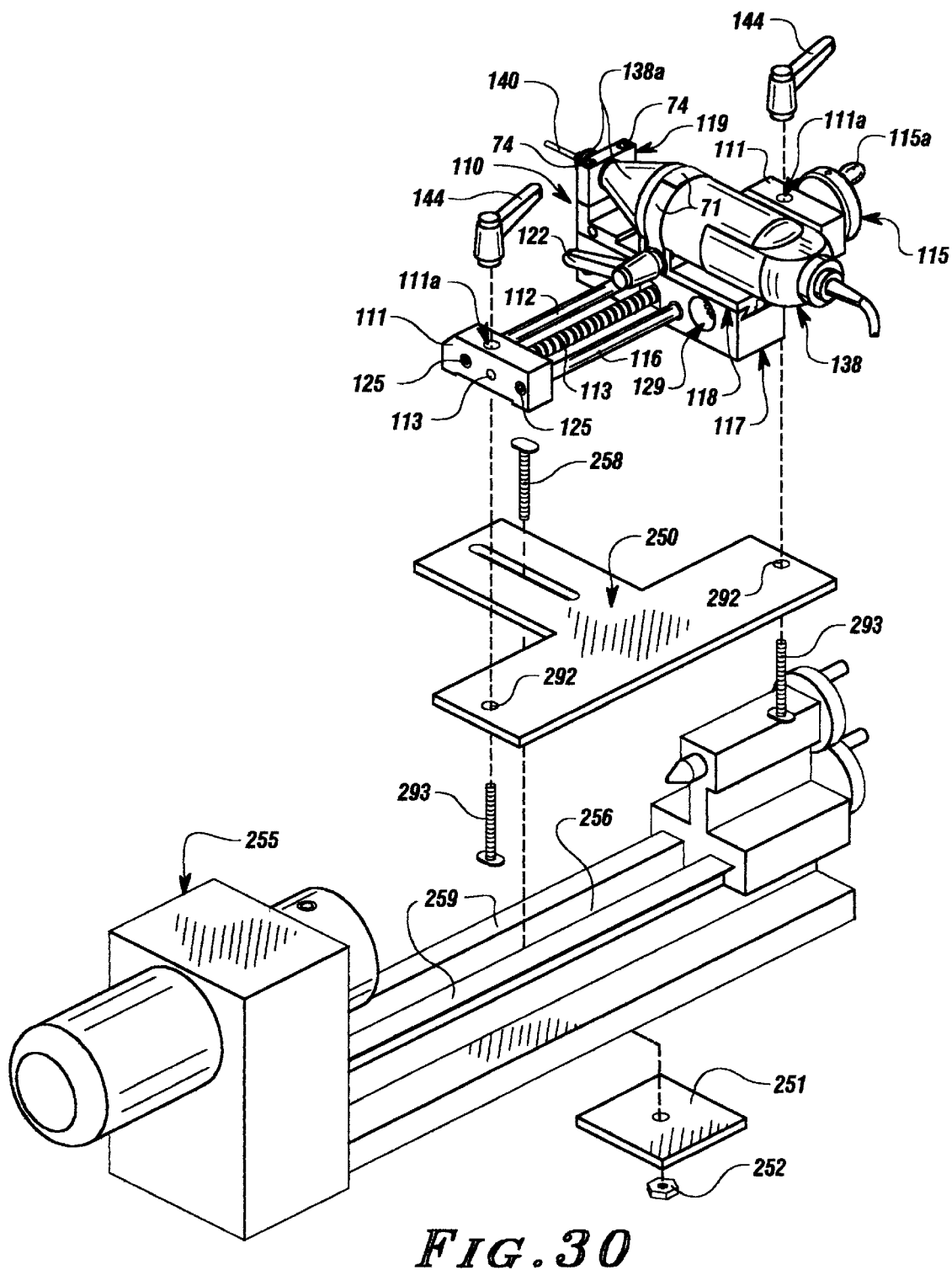
FIG. 30 is an exploded, perspective view of a mini lathe embodiment of the multi-purpose machining apparatus of this invention.

As illustrated in FIG. 28, the attachment support 295 is a post which is mounted on a tool post receiver (not illustrated) on large wood turning lathes in a conventional manner, where a height adjustment and/or rotational movement is facilitated in a manner well known to those skilled in the art. FIG. 30 illustrates a conventional mini lathe 255, typically having a split bedway 259 and a gap 256 and a T-plate adaptor 250 having cradle bolt openings 292, secured by a pair of cradle mount 293 to the cradle frame 110. The adaptor plate 250 may be of desired thickness to act as a shim and is, in turn, mounted on the mini lathe 255 by means of a plate bolt 258 and backing plate 251, secured by a backing plate nut 252. The purpose of the adaptor plate 250 is to align the cutting tool bit 140 (FIG. 29) with the centerline of the headstock and tailstock of the mini lathe 255, which cannot be accomplished by the tool post design illustrated in FIG. 29, due to the fact that the clearance above the bedway 259 to the workstock centerline is much less than the corresponding clearance on larger lathes. This T-plate adaptor 250 eliminates the tool post carriage assembly used in larger lathes for the purpose of accomplishing a minimal height from the bedway-to-lathe centerline. This is accomplished by resting the T-plate adaptor 250 on the bedway 259 of the mini lathe 255 over the gap 256, inserting the cradle mount bolts 293 through the gap 256 in the bedway 259 and the cradle bolt openings 292 in the T-plate adaptor 250, and threading the frame adjustment handles 144 on the ends of the cradle mount bolts 293. The backing plate 251, with the nut 252, threaded on the plate bolt 258, is used to secure the T-plate adaptor 250 on the bedway 259 of the mini lathe 255. It can be seen that the rotary cutting tool 138, traversing the cradle frame 10 in FIG. 29, can be mounted to cut parallel to the centerline of the mini lathe 255, as well as in a taper cutting configuration, according to the knowledge of those skilled in the art.

It will be appreciated by those skilled in the art that the multi-purpose machining apparatus of this invention is extremely versatile and can be utilized, not only in various cutting modes described herein, but also with a wide variety of rotary tools. In addition to the DREMEL (trademark) tool and the flex-shaft hand tool described herein, other rotary tools, such as trim routers, routers, electric motors, hand drills and the like, whether electric or air-operated, can be used to both drive the headstock and perform the cutting functions with a suitable adaptor or mount in place. Accordingly, the invention makes full use of a rotaly tool to perform specified cutting functions on a workstock driven in a cradle frame mounted on a support, in both horizontal and vertical configurations.

It will be further appreciated that the multi-purpose machining apparatus is susceptible of being operated by a computer and an appropriate interfacing devices driving stepper motors coupled to lead screws and/or rack and pinion assemblies, according to the knowledge of those skilled in the art.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A multi-purpose machining apparatus for facilitating various machining operations of a cutting tool on workstocks, said apparatus comprising a support frame having a headstock and a tailstock for receiving a workstock, said support frame capable of positioning in a first position wherein the cutting tool is operable for engaging the workstock in at least one of a lathing configuration and a sawing configuration, and said support frame capable of positioning in a second position wherein the cutting tool is operable for engaging the workstock in at least one of a milling configuration, a drilling configuration and a routing configuration; a cradle frame provided in said support frame for mounting the cutting tool, said cradle frame capable of positioning in an offset position on said support frame for tapering the workstock by operation of the cutting tool when the cutting tool is operable for engaging the workstock in said lathing configuration with said support frame in said first position; and a drive mechanism for operable connection to the workstock in said lathing configuration and rotating the workstock on said support frame.

2. The apparatus of claim 1 comprising a workstock mounting attachment selected from the group consisting of a chuck, a faceplate, a drive spur and a mandrel, for removable attachment to said headstock in said support frame and receiving the workstock in said lathing configuration.

3. The apparatus of claim 1 comprising a rotary table for removable attachment to said cradle frame and receiving the workstock in said milling, drilling and routing configuration.

4. The apparatus of claim 2 comprising an index head for mounting on said headstock in said support frame and receiving the workstock in said lathing configuration.

5. The apparatus of claim 3 comprising a router table for removable attachment to said rotary table and receiving the workstock in said routing configuration.

6. The apparatus of claim 1 wherein said cutting tool comprises a normally hand-held rotary power tool.

7. The apparatus of claim 6 comprising a rotary table for removable attachment to said cradle frame and receiving the workstock in said milling, drilling and configuration.

8. The apparatus of claim 5 wherein said cutting tool comprises a normally hand-held rotary power tool.

9. The apparatus of claim 1 comprising a saw table for removable attachment to said support frame and a saw blade rotatably carried by said saw table, wherein the cutting tool is capable of operably engaging said saw blade for rotating said saw blade in said saw table and said saw blade is operable for engaging the workstock in said saw configuration.

10. The apparatus of claim 9 wherein said cutting tool comprises a normally hand-held rotary power tool.

11. The apparatus of claim 1 wherein said drive mechanism comprises a power-driven rotary tool.

12. The apparatus of claim 1 wherein said drive mechanism comprises a hand crank.

13. The apparatus of claim 1 wherein said drive mechanism comprises a hand crank and belt drive assembly.

14. The apparatus of claim 1 wherein said cradle frame is removed from said support frame and comprising an adaptor plate for receiving said cradle frame and mounting said cradle frame on a mini lathe.

15. The apparatus of claim 14 wherein said cutting tool comprises a normally hand-held rotary power tool.

16. The apparatus of claim 12 comprising a computer and a driver electrically connected to said hand crank for executing said machining operations.

17. A multi-purpose machining apparatus for facilitating various machining operations of a cutting tool on workstocks, said apparatus comprising a support frame having a headstock and a tailstock for receiving a workstock, said support frame capable of resting in a first position wherein the cutting tool is operable for engaging the workstock in at least one of a lathing configuration and a sawing configuration, and said support frame capable of resting in a second position wherein the cutting tool is operable for engaging the workstock in at least one of a milling configuration, a drilling configuration and a routing configuration; a cradle frame provided in said support frame for mounting the cutting tool; a cutting tool mount cradle adjustably carried by said cradle frame for receiving the cutting tool; a rotary table for removable attachment to said cradle frame and receiving the workstock in said milling, drilling and routing configurations; and a drive mechanism for operable connection to the workstock in said lathing configuration and rotating the workstock on said support frame.

18. The apparatus of claim 17 comprising a workstock mounting attachment selected from the group consisting of a chuck, a faceplate, a drive spur and a mandrel, for removable attachment to said headstock in said support frame and receiving the workstock in said lathing configuration.

19. The apparatus of claim 17 wherein said cutting tool comprises a normally hand-held rotary power tool.

20. The apparatus of claim 17 comprising a router table for removable attachment to said rotary table and receiving the workstock in said routing configuration.

21. The apparatus of claim 20 comprising an index head for mounting on said headstock in said support frame and receiving the workstock in said lathing configuration.

22. The apparatus of claim 17 wherein said cutting tool comprises a normally hand-held rotary power tool.

23. The apparatus of claim 21 wherein said cutting tool comprises a normally hand-held rotary power tool.

24. A multi-purpose machining apparatus for facilitating various machining operations of a cutting tool on workstocks, said apparatus comprising a support frame having a headstock and a tailstock for receiving a workstock, said support frame capable of resting in a first position wherein the cutting tool is operable for engaging the workstock in at least one of a lathing configuration and a sawing configuration, and said support frame capable of resting in a second position wherein the cutting tool is operable for engaging the workstock in at least one of a milling configuration and a routing configuration; a cradle frame provided in said support frame for mounting the cutting tool; a rotary table for removable attachment to said cradle frame and receiving the workstock in said milling, drilling and rotary configurations; a cutting tool mount cradle adjustably carried by said support frame for receiving the cutting tool; a drive mechanism for operable connection to the workstock in said lathing configuration and rotating the workstock on said support frame; and a saw table for removable attachment to said support frame and a saw blade rotatably carried by said saw table, wherein the cutting tool operably engages said saw blade for rotating said saw blade in said saw table and said saw blade is operable for engaging the workstock in said saw configuration.

25. The apparatus of claim 24 comprising a workstock mounting attachment selected from the group consisting of a chuck, a faceplate, a drive spur and a mandrel, for removable attachment to said headstock in said support frame and receiving the workstock in said lathing configuration.

26. The apparatus of claim 24 wherein said cutting tool comprises a normally hand-held rotary power tool.

27. The apparatus of claim 24 comprising a router table for removable attachment to said rotary table and receiving the workstock in said routing configuration.

28. The apparatus of claim 27 wherein said cutting tool comprises a normally hand-held rotary power tool.

* * * * *